(12) United States Patent
Hanback

(10) Patent No.: US 11,725,850 B2
(45) Date of Patent: Aug. 15, 2023

(54) METHOD AND SYSTEM FOR ULTRA-DEEP BOREHOLE GEOTHERMAL ENERGY HARVESTING

(71) Applicant: Mass Flow Energy, Inc., Jeffersonton, VA (US)

(72) Inventor: John Wesley Hanback, Jeffersonton, VA (US)

(73) Assignee: Mass Flow Energy, Inc., Jeffersonton, VA (US)

( * ) Notice: Subject to any disclaimer, the term of this patent is extended or adjusted under 35 U.S.C. 154(b) by 0 days.

(21) Appl. No.: 17/658,910

(22) Filed: Apr. 12, 2022

(65) Prior Publication Data
US 2022/0333825 A1 Oct. 20, 2022

Related U.S. Application Data

(60) Provisional application No. 63/258,153, filed on Apr. 15, 2021.

(51) Int. Cl.
*F24T 10/13* (2018.01)
*F24T 10/20* (2018.01)
(Continued)

(52) U.S. Cl.
CPC ............... *F24T 10/13* (2018.05); *E21B 7/04* (2013.01); *E21B 19/16* (2013.01); *F24T 10/20* (2018.05); *E21B 19/06* (2013.01); *F24T 2010/53* (2018.05)

(58) Field of Classification Search
CPC ....... F24T 10/13; F24T 10/20; F24T 2010/53; E21B 7/04; E21B 19/16; E21B 19/06
See application file for complete search history.

(56) References Cited

U.S. PATENT DOCUMENTS

| | | | | |
|---|---|---|---|---|
| 4,090,572 A | * | 5/1978 | Welch | ............... E21B 7/15 219/121.84 |
| 5,351,767 A | * | 10/1994 | Stogner | ............... E21B 19/16 175/203 |

(Continued)

OTHER PUBLICATIONS

International Search Report issued in PCT/US22/71675, dated Jun. 27, 2022.

*Primary Examiner* — Tho V Duong
(74) *Attorney, Agent, or Firm* — Ice Miller LLP

(57) ABSTRACT

A multivessel system is provided for installing a production train in an ultra-deep borehole into the Earth's lithosphere. The system includes a plurality of gate valves and a plurality of pressure vessels, including a first pressure vessel having a first vessel elevator configured to engage and hold a production train section as the first vessel elevator moves in the first pressure vessel along a portion of a length of a train channel, a second pressure vessel having a second vessel elevator configured to engage and hold the production train section as the second vessel elevator moves in the second pressure vessel along another portion of the length of the train channel, and a third pressure vessel, with all three pressure vessels being configured to be water cooled. The system includes a train clamp configured to engage and hold the production train in the borehole. Each of the first vessel elevator and the second vessel elevator includes a clamp configured to engage and hold the train section as the respective first vessel elevator or the second vessel elevator moves along the train channel.

19 Claims, 13 Drawing Sheets

(51) Int. Cl.
*E21B 7/04* (2006.01)
*E21B 19/16* (2006.01)
*F24T 10/00* (2018.01)
*E21B 19/06* (2006.01)

(56) References Cited

U.S. PATENT DOCUMENTS

| | | |
|---|---|---|
| 6,315,051 B1 | 11/2001 | Ayling |
| 8,393,410 B2 | 3/2013 | Woskov et al. |
| 9,890,594 B2 | 2/2018 | Hanback |
| 2004/0154835 A1 | 8/2004 | Mien et al. |
| 2008/0245528 A1* | 10/2008 | Stokka ............... E21B 21/001 166/360 |
| 2012/0227925 A1* | 9/2012 | Sweeney ............. F01K 3/186 165/10 |
| 2014/0124267 A1 | 5/2014 | Ayling |
| 2014/0202767 A1* | 7/2014 | Feasey ................ E21B 19/16 166/305.1 |
| 2017/0191323 A1 | 7/2017 | Ayling |
| 2018/0128938 A1* | 5/2018 | Wang .................. E21B 47/07 |
| 2018/0209218 A1 | 7/2018 | Hanback |
| 2021/0348490 A1* | 11/2021 | Wheatley ............. E21B 47/02 |
| 2022/0333827 A1 | 10/2022 | Hanback |

* cited by examiner

METHOD AND SYSTEM FOR ULTRA-DEEP BOREHOLE GEOTHERMAL ENERGY HARVESTING

CROSS REFERENCE TO RELATED APPLICATIONS

This application is entitled to and hereby claims priority under 35 U.S.C. § 119(e) to provisional U.S. patent application, Ser. No. 63/258,153, filed Apr. 15, 2021, titled, "Mass Flow Power Energy Production Process and System," which is hereby incorporated herein in its entirety.

TECHNICAL FIELD

The present disclosure relates to geothermal power conversion, and, more particularly, to a method, a system, an apparatus and a computer program for extracting geothermal energy from an ultradeep borehole, including removing a drill train and installing a production train in the borehole.

BACKGROUND

The Earth's core is made up of a number of layers, with the outermost layer being the lithosphere and the innermost layer being the inner core. The lithosphere comprises the Earth's crust, a shell that lies atop of the mantle and has an average thickness estimated to be between about nine miles (9 mi) and twelve miles (12 mi). The mantle lies atop of an outer core, which in turn lies atop of an inner core that has a radius estimated to be around seven-hundred-sixty miles (760 mi). The temperature increases with depth, with the temperature of the crust increasing as much as forty-eight degrees Centigrade (48° C.) for every mile, with values typically about six-hundred-degrees Centigrade (600° C.) at the boundary with the mantle.

The geothermal aspects of the Earth's core have been used as a renewable energy source for a long time, with applications in heating systems and geothermal power systems.

Conversion of geothermal energy to electric form has traditionally been a marginally economic and inefficient endeavor. However, by developing new drilling techniques capable of reaching unprecedented depths, new and highly efficient geothermal facilities can be created.

SUMMARY

The present disclosure provides a method, system, apparatus and computer program for installing a production train into an ultra-deep borehole into the Earth's lithosphere. In embodiment, a multivessel system is disclosed comprising a plurality of pressure vessels for installing a production train into an ultra-deep borehole into the Earth's lithosphere. The system comprises: a plurality of gate valves, each gate valve being configured to provide a hermetic seal between at least two spaces; a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a train channel, the first pressure vessel further comprising a first vessel downstream opening; a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the train channel, the second pressure vessel further comprising a second vessel downstream opening; a third pressure vessel comprising a third vessel upstream opening configured to receive the train section from the second vessel downstream opening through a third one of said plurality of gate valves, the third pressure vessel being configured with a smooth cylinder bore and a burn gas ejection piston with a center hole through which the production train passes and containing a pressure sealing clamp configured to hold and connect the train section to the production train, the third pressure vessel comprising a third vessel downstream opening; an input-output separator configured to segregate a supercritical fluid up-flowing from the borehole from a pressurized fluid being supplied into the borehole; and a train clamp configured to engage and hold the production train in the borehole, wherein each of said first vessel elevator and said second vessel elevator includes a clamp configured to engage and hold the train section as the respective first vessel elevator or the second vessel elevator moves along the train channel.

In an embodiment, the multivessel system has a plurality of pressure vessels for installing a production train in an ultra-deep borehole into the Earth's lithosphere, comprising: a plurality of gate valves, each gate valve being configured to provide a hermetic seal between at least two spaces; a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a train channel, the first pressure vessel further comprising a first vessel downstream opening; a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the train channel, the second pressure vessel further comprising a second vessel downstream opening; and a train clamp configured to engage and hold the production train in the borehole, wherein each of said first vessel elevator and said second vessel elevator includes a clamp configured to engage and hold the train section as the respective first vessel elevator or the second vessel elevator moves along the train channel.

The multivessel system can include a third pressure vessel comprising a third vessel upstream opening configured to receive the train section from the second vessel downstream opening, wherein at least one of the first pressure vessel, the second pressure vessel and the third pressure vessel comprises a robotic arm that is configured to connect the train section to the production train.

The first vessel elevator or the second vessel elevator can comprise an internal spiral hydraulic ball screw elevator.

The production train can include one or more super-insulated well pressure vessel walls constructed with different wall thicknesses between different super-insulated well pressure vessels, the different wall thickness being selected based on expected differences in interior and exterior pressures of the super-insulated well pressure vessels installed at different elevations in the borehole.

The multivessel system can include one or more high-pressure fluid pumps, each being configured to operate at an adjustable speed, ranging from a complete shutdown of the borehole to a maximum speed that results in maximum mass flow of super-critical fluid, including any intermediate, fully adjustable power setting.

The multivessel system can include a controller, wherein operation of the one or more high-pressure fluid pumps is controlled by the controller such that the borehole can be shut down in a sequence to allow for heat build-up while another fluid pump at another borehole is operated for geothermal energy harnessing at said another borehole.

The third pressure vessel can have a smooth internal cylinder bore and a piston having an internal pressure sealing hydraulic pipe clamp and attached to the second vessel elevator by a fixed steel tube to allow the production train to pass through the piston and be pressure sealed and at the same time allow an exhaust waste gas to be ejected and separated.

The multivessel system can include an input-output separator configured to segregate an outlet fluid up-flowing through the production train from an inlet fluid being supplied to the borehole.

The multivessel system in can include a fixed hydraulic conical clamp located between the third pressure vessel and input-output separator.

The production train can include a carbon fiber-ceramic layer.

The production train can include a plurality of graphene super insulated pressure vessels insertable into the borehole for receiving a supercritical fluid from the borehole, whereby the supercritical fluid is produced in the lower regions of the borehole.

In an embodiment, each of a plurality of graphene super insulated pressure vessels can be configured to maintain a temperature of the supercritical fluid temperature substantially equal to a temperature at a bottom of the borehole.

The multivessel system can include a robot that is configured to plug weld and circumferentially weld the train section to the production train to create a pressure seal and add adequate tensile strength as the production train is lowered into the borehole.

The borehole can be lined with a high temperature sealant during extraction of a drill train from the borehole prior to installation of the production train.

The supercritical fluid can include supercritical water or supercritical carbon dioxide.

The multivessel system can include a sleeve in the borehole containing super insulating graphene protected by a carbon fiber/ceramic sleeve.

The multivessel system can include one or more underground super insulated refractory concrete vaults filled with micro perlite and a vacuum applied after installation.

The multivessel system can include a well pressure retention and flow control valve and a second type of input-output flow separator, wherein the second type of input-output flow separator is configured to separate a pressurized fluid being introduced into the borehole from an exiting supercritical fluid and direct the supercritical fluid to the well pressure retention and flow control valve.

In an embodiment, a method is disclosed for installing a production train in an ultra-deep borehole into the Earth's lithosphere. The method includes depressurizing a first pressure vessel having a first vessel upstream opening, a train channel, and a first vessel downstream opening; opening a first gate valve to provide access to the first vessel upstream opening; inserting a train section through the first vessel upstream opening into the first pressure vessel; clamping and holding, by one of a plurality of elevators equipped with a clamp, the train section in the first pressure vessel; closing the first gate valve and pressurizing the first pressure vessel; opening a second gate valve located downstream of the first vessel downstream opening; clamping and lowering, by activating movement of another one of the plurality of elevators, the train section into a second pressure vessel; closing the second gate valve and depressurizing the first pressure vessel; moving said another one of the plurality of elevators downward until the train section contacts or is within a predetermined distance of an upstream end of a production train equipped at a downstream end with a production train base; connecting, by a robot, the train section to the upstream end of the production train; and lowering the production train into a borehole while inserting another train section into the first pressure vessel.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
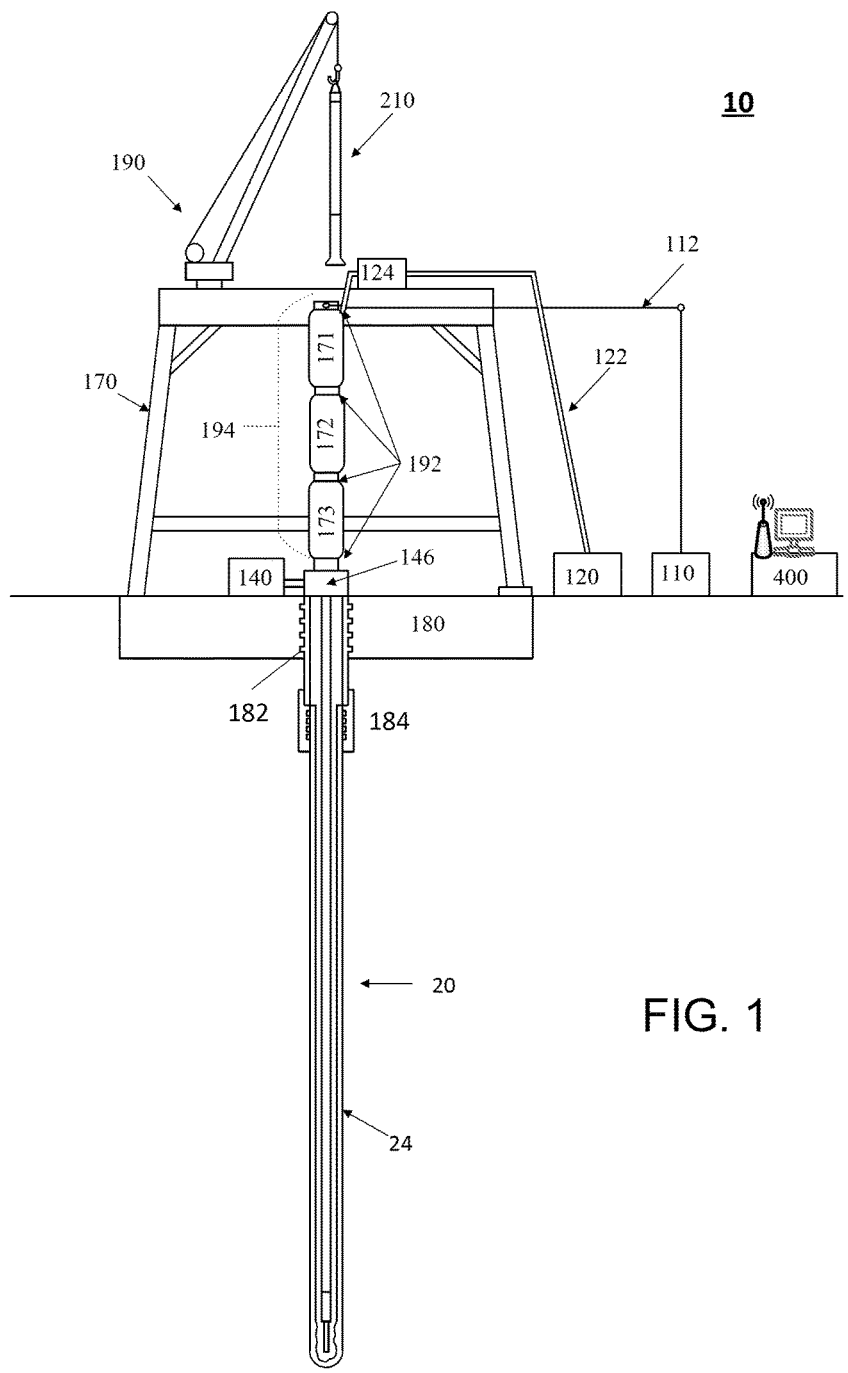
FIG. 1 depicts an embodiment of an ultra-deep well (UDW) production train installation system.

The present disclosure is further described in the detailed description that follows.

DETAILED DESCRIPTION

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

State-of-the art borehole well drilling systems use mechanical drills that include the implementation of well drilling mud to remove the fractured and ground particles from the borehole and to provide pressure to prevent the borehole from collapsing. Such systems typically have practical depth limits around 20,000 feet deep. While such depth limits might be adequate for oil and gas recovery, they are insufficient for geothermal applications. Such depth limits provide only minimal heat for geothermal use, about 360° F. on average. This is not hot enough for economical large scale power production.

U.S. Pat. No. 9,890,594 entitled "Advanced Drilling Systems and Methods," issued Feb. 13, 2018, to the inventor of the instant disclosure, John Hanback, which is hereby incorporated in its entirety, describes new systems and methods capable of reaching unprecedented depths. The systems and methods described in the patent facilitate creation of highly efficient geothermal facilities. The patent describes a gyrotron drilling system that can be used to melt rock and other strata as the drilling system progresses vertically downward into the Earth's crust. Details of the gyrotron drilling system can be found in U.S. Pat. No. 8,393,410 entitled "Millimeter-Wave Drilling System," issued Mar. 12, 2013, to Paul P. Woskov, et al., which is hereby incorporated in its entirety.

U.S. patent application Ser. No. 17/658,364, filed Apr. 7, 2022, entitled "Method and System for Deep-Drilling for Renewable Energy," and hereby incorporated herein in its entirety, describes embodiments of methods, systems, apparatuses and computer programs for drilling ultra-deep boreholes for geothermal energy extraction. The same ultra-deep well (UDW) drilling system 10 described in the patent application can be operated to extract a drill train from an ultra-deep well borehole 20 and replace it with a production train 200.

FIG. 1 depicts an embodiment of an ultra-deep well (UDW) production train installation (PTI) system 10, constructed according to the principles of the disclosure. In an embodiment, the PTI system can include the UDW drilling system 10 described in U.S. patent application Ser. No. 17/658,364, and the drill train includes the drill train and energy beam drill described in the patent application. In various embodiments, the PTI system 10 is configured to withdraw a drill train from an ultra-deep borehole 20 after drilling is completed and install a production train 200 (shown in FIG. 12) in its place while maintaining a substantially constant pressure in the borehole 20 at all times.

Figure 2:
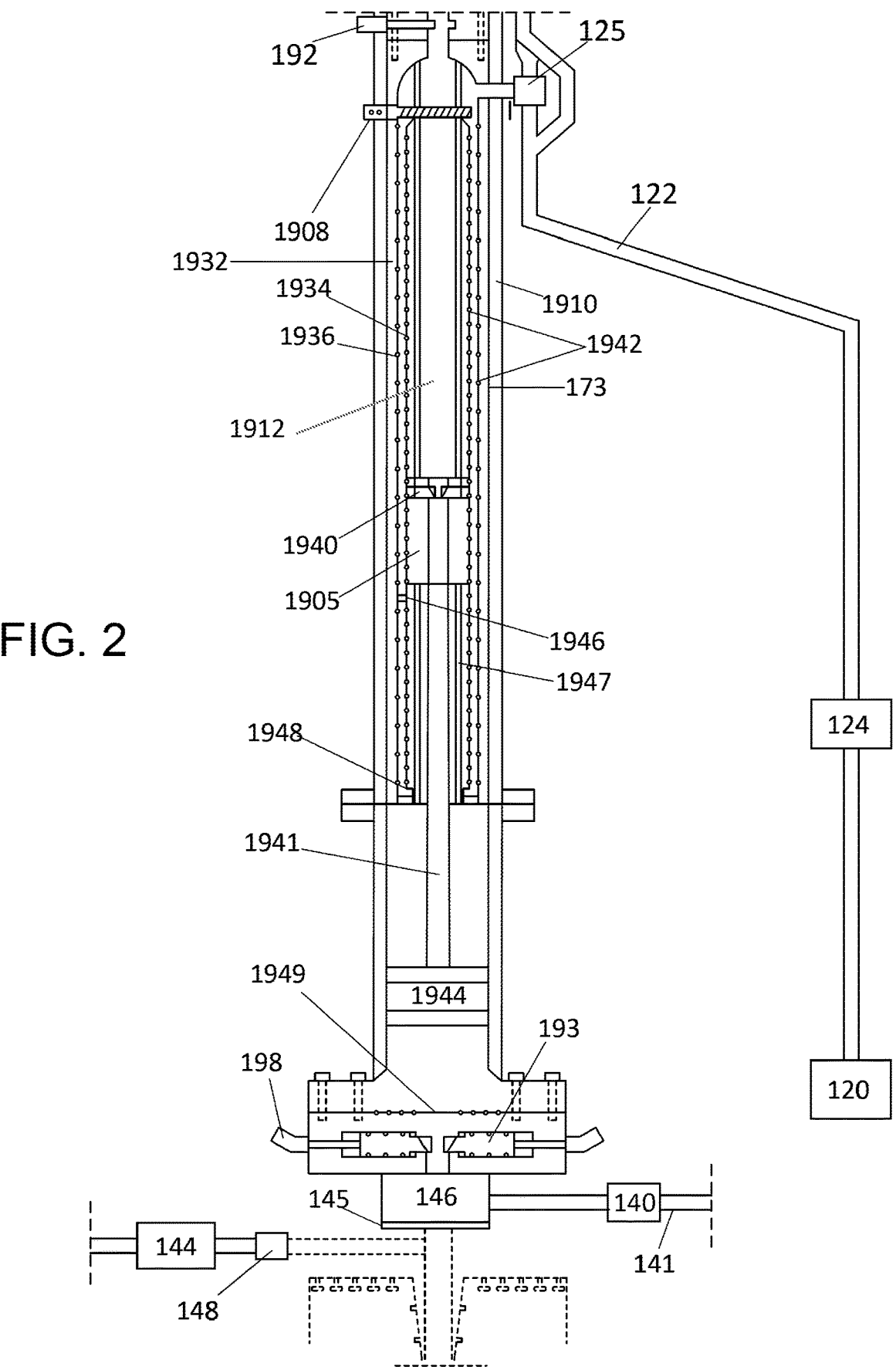
FIG. 2 depicts a cross-section view of a portion of the UDW production train installation system.
Figure 3:
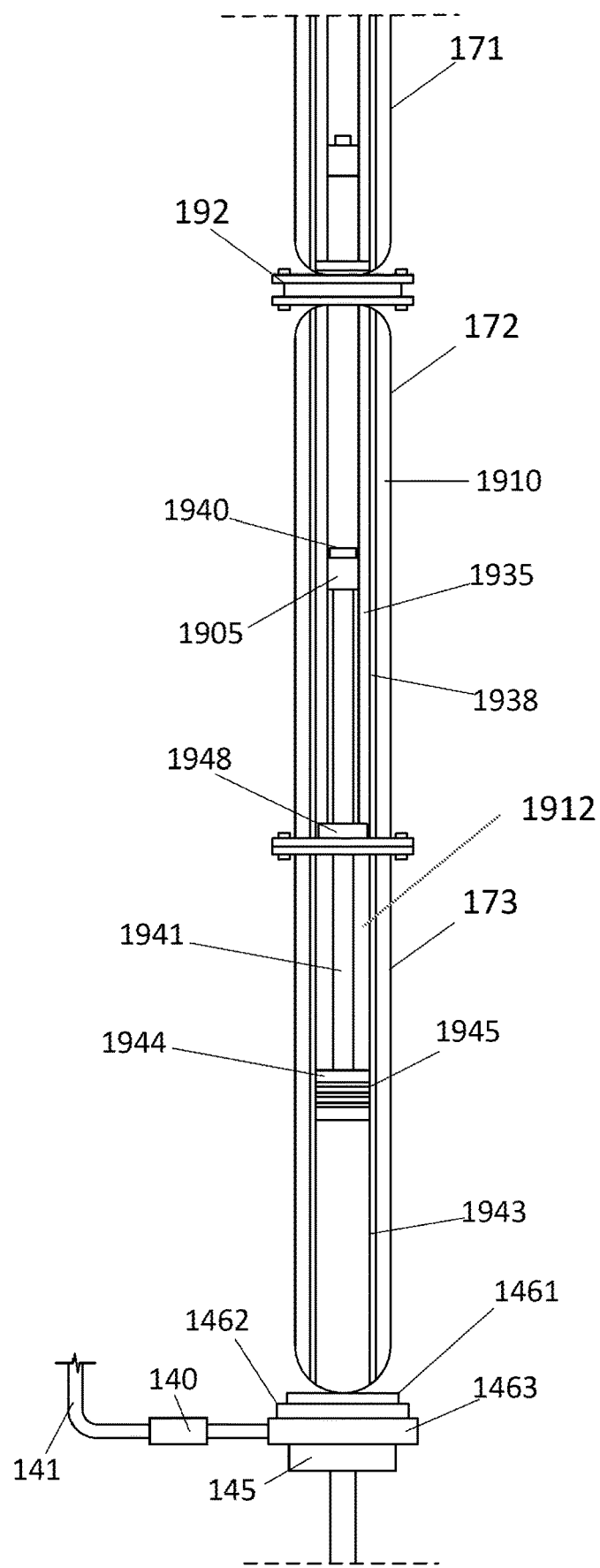
FIG. 3 depicts a partial cross-section view of an embodiment of a multivessel pressure vessel system in the UDW production train installation system.

FIGS. 2 and 3 each depict a cross-cut view of a portion of an embodiment of the PTI system 10, including a multivessel pressure vessel system 194.

Referring to FIGS. 1-3, the PTI system 10 can include a power supply 110, a power line 112, a gas generator 120, a gas supply line 122, a compressor 124, an outlet pressure control valve system 140, a high-pressure fluid pump 144, a shutoff valve 145, an inlet-outlet (IO) flow separator 146, an inlet pressure control valve system 148, a tower 170, a well foundation 180, and a crane 190. The platform can include a multivessel pressure vessel system 194, a vessel-foundation connector (not shown), and the controller 400. Any one or more of the components can be affixed to, co-located with, or located apart from the platform. The outlet pressure control valve system 140 can include a fluid flow control and a well pressure control (FCPC) valve system. The outlet pressure control valve system 140 can include an outlet line 141.

The shutoff valve 145 can be configured to hermetically seal the borehole 20 from the surrounding environment, including components of the the PTI system 10. The shutoff valve 145 can be configured to hermetically seal the borehole 20 from the surrounding environment and allow removal of any or all of the components in the PTI system 10.

The PTI system 10 can be configured to remove a drill train from the borehole 20 after completion of drilling and replace it with a production train 200 to about 60,000 feet, or deeper into the Earth's lithosphere, to provide working fluid well temperatures of about 1,000° F. to about 1,300° F., or greater.

The pressure in the borehole 20 can be maintained or adjusted by the controller 400 by adjusting a well bore entrance control pressure/flow via the inlet pressure control valve system 148 and a well bore exit pressure/flow via an outlet pressure control valve system 140, using the borehole gases with additional pressure being added by a nitrogen compressor as needed and acting as a counter pressure to the Earth's ever-increasing lithostatic pressure. For example, an ultra-high pressure, such as, for example, above 40,000 pounds-per-square-inch (psi), and preferably between about 55,000 psi and about 65,000 psi can be achieved and maintained by the PTI system 10. This pressure control, combined with the light weight of the drill train and production train 200 compared to state-of-the-art well casing or borehole tubing, allows the PTI system 10 to reach extreme depths, such as, for example: between about 20,000 feet and about 60,000 feet, or more; between about feet, 41,000 and about 60,000 feet, or more; or in excess of 60,000 feet.

The power generator 110 can include, for example, a geothermal powered generator, a diesel power generator, a gas power generator, a solar powered generator, a wind powered turbine generator, a wave-powered generator, a power generation station, or an electrical power grid. The power generator 110 can be electrically coupled to the power lines 112.

The power line 112 can include, for example, a high wattage power cable. The power line 112 can be coupled electrically to the power generator 110 at one end and to the platform, the drill train, the production train 200, or the controller 400 at another end. The power line 112 can be configured to carry electrical power from the power generator 110 to any component in the PTI system 10, including a robotic system (not shown) included in the multivessel system 194, that can use electrical power to operate.

The gas generator 120 can include a generator, or a gas supply line containing, for example, a gas such as nitrogen. The gas can be supplied to the compressor 124 via the gas supply line 122, where the gas can be compressed before being supplied via one or more gas inlet valves 125 (shown in FIG. 2) to the pressure vessels 171, 172, 173 in the multivessel system 194 as an ultra-pressurized gas. The gas generator 120 can be configured to provide substantially pure gas such as nitrogen, which can be sufficiently concentrated and devoid of other gases, such as, for example, oxygen or water vapor, so as to prevent any dangerous levels of combustion within the borehole 20.

The platform can be configured to remove and transport each drill train section away from the PTI system 10 during drill train extraction, and to transport and deliver each train section 210 to the insertion site on the platform and align, insert, and guide each train section 210 into the multivessel pressure vessel system 194 during installation of the production train 200. The platform 100 can be further configured to deliver each train connector 212 to the multivessel system 194. The train section 210, after being coupled to the preceding train section, for example, using the train connector 212 or a threaded screw connector or a slide one section over the other welded connector, can move downward as the production train 200 progresses into the borehole 20. Simultaneously, the pressure in the borehole 20 and the PTI system 10 can be maintained at a predetermined pressure value at all times.

The fluid pump 144 can include an ultra, high-pressure water pump that is adjustable in speed (for example, revolutions-per-minute or RPM), ranging from 0 RPM to a maximum RPM that results in maximum mass flow of supercritical fluid (maximum power) or any intermediate (fully adjustable) power setting for the borehole 20. The fluid pump 144 can be operated, for example, under the instruction of the controller 400, to pressurize and inject the highly-pressurized liquid (for example, water) into the borehole 20, thereby controlling the rate at which supercritical fluid flows up a production train (not shown) during geothermal power harnessing.

The tower 170 can be configured to support the crane 190 and the multivessel pressure vessel system 194 in positional relationship such that the crane 190 can be operated to pick up an individual train section 210 from a nearby location, such as, for example, a delivery truck (not shown) or it's storage container, and deliver it to the uppermost gate valve 192 in the multivessel system 194. The crane 190 can then position and align the train section 210 with the opening in the multivessel pressure vessel system 194 before lowering the train section 10 into an upstream (or uppermost) pressure vessel 171 in the multivessel system 194.

The tower 170 can be mounted atop of and affixed to the well foundation 180. The well foundation 180 can include a dense, rigid, high-strength material such as, for example, concrete or steel. The well foundation 180 can include a well-cap casting 182 and a metal well seal 184. The well-cap casting can include a ribbed Hastelloy X or other high temperature nickel alloy.

The multivessel pressure vessel system 194 can include a plurality of pressure vessels 191, including, for example, an upstream (or upper) pressure vessel 171, a center (or middle) pressure vessel 172, and a downstream pressure vessel 173. The multivessel system 194 can include fewer or more than three pressure vessels. The bottommost pressure vessel 173 can be affixed to the vessel-foundation connector using fasteners such as, for example, bolts. The vessel-foundation connector can, in turn, be fastened to the well foundation 180 and/or the well-cap casting by means of fasteners such as, for example, concrete studs.

The vessel-foundation connector can include the flow separator 146, which can be configured to guide the outlet fluid flow from the borehole 20 to the outlet pressure control valve system 140. The inlet pressure control valve 148 can be configured to guide the inlet fluid from, for example, the high-pressure fluid pump 144, into the borehole 20. The flow separator 146 can include a multichannel manifold.

The shutoff valve 145 can be closed after drilling stops and the borehole 20 is completed. The drill train with energy beam drill can be removed from the borehole 20 by operating the PTI system 10 according to, for example, a process 300A depicted in FIG. 4.

Figure 4:
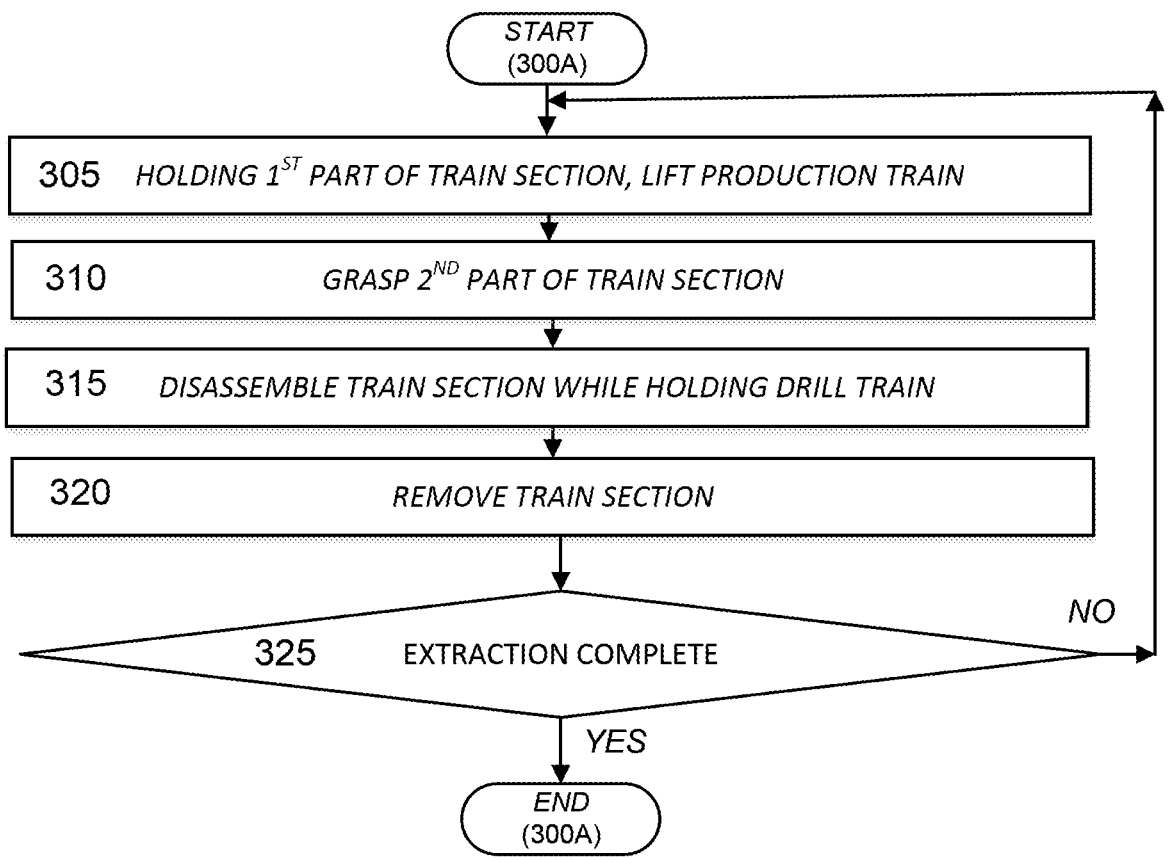
FIG. 4 depicts an embodiment of a process for extracting a drill train from an ultra-deep well.

FIG. 4 depicts an embodiment of a drill train extraction process 300A that can be implemented by the PTI system 10, for example, under instructions from the controller 400. Holding a first portion (for example, top portion) of a drill train section (Step 305), the mechanisms (discussed below) in the multivessel system 194 can lift the drill train from the borehole 20 and grasp a second portion (for example, bottom portion) of the drill train section (Step 310). While holding the drill train from falling into the borehole 20, a robot (not shown) can disassemble (for example, unscrew) the train section from the drill train (Step 315) and remove, using the crane 190 (shown in FIG. 1), the drill train from the multivessel system 194 (Step 320). A determination can be made whether the last train section has been removed (Step 325). If it is determined that the last train section has been removed (YES at Step 325), then the energy beam drill is removed and the drill train extraction process ends, otherwise (NO at Step 325) the process repeats for each drill train section until the last train section is reached.

The controller 400 can include one or more computing devices, communicating devices or computing resources. The controller 400 can include any combination of, for example, a central processing unit (CPU), an ARM (Advanced Risk Machines) CPU, a graphic processing unit (GPU), a general-purpose GPU (GPGPU), a field programmable gate array (FGPA), an application-specific integrated circuit (ASIC), a system-on-a-chip (SOC), a single-board computer (SBC), a complex programmable logic device (CPLD), a digital signal processor (DSP), a many core processor, multiple microprocessors, or any computing device architecture capable of performing the operations described or contemplated herein. The controller (not shown) can include a storage (not shown). The storage can include a read-only-memory (ROM), a random-access-memory (RAM), and a computer-readable medium. In an embodiment, the controller (not shown) includes a processor that can interact with the storage (not shown) to execute computer program code or instructions to perform the processes provided or contemplated by the disclosure.

The PTI system 10 and borehole 20 can be configured as an adjustable closed system, wherein the purged gas is recycled and reinjected into, and through the multivessel system 194, to the borehole 20. In an embodiment, the closed gas system can include the IO flow separator 146, the outlet pressure control valve system 140, the inlet pressure control valve system 148 (shown in FIG. 2), the gas generator 120, the gas supply line 122, the gas inlet valves 125, the multivessel system 194, and the borehole 20. The IO flow separator 146 can include, for example, a pipeline manifold.

The inlet pressure control valve system 148 (shown in FIG. 2) and the outlet pressure control (or FCPC) valve system 140 can be connected to the controller 400 via communication links. The controller 400 can be configured to monitor and maintain an ultra-pressurized closed system at a predetermined pressure value, or within a predetermined range of values above and below a setpoint pressure. The controller 400 can be configured to adjust the pressure in the closed system, including the borehole 20, by controlling one or more of the components in the inlet pressure control valve system 148. The controller can be configured to adjust or control pressure, for example, via the gas inlet valves 125, the inlet flow control valve 148 and one or more of the components in the outlet pressure control valve system 140 (for example, an outlet flow control valve).

Through control of the fluid pump 144, outlet pressure control valve system 140, and inlet pressure control valve system 148, the controller 400 can maintain a setpoint pressure value (or range of pressure values) for the PTI system 10 and borehole 20 and. The controller 400 can be configured to monitor the real-time closed system pressure and adjust operation of the fluid pump 144, the inlet pressure control valve system 148, and the outlet pressure control valve system 140 to increase or decrease the closed system pressure to the setpoint value. In this regard, the controller 400 can also control the gas generator 120 to supply additional pressurized gas, as needed. The controller 400 can be configured to maintain the closed system pressure at or near a predetermined setpoint pressure value during extraction of the drill train from the borehole 20, installation of the production train 200 in the same borehole 20, and subsequent geothermal energy harnessing, at all times maintaining pressure sufficient to keep the borehole wall casing from cracking or collapsing.

In various embodiments, the controller 400 can be connected, via one or more communication links to various components in the PTI system 10, including the gas generator 120, the compressor 124, the outlet pressure control valve system 140, the inlet pressure control valve system 148, the high-pressure fluid pump 144, the gate valves 192, the robotic system (not shown), and the multivessel system 194 to control operation of the PTI system 10 in extracting the drill train and replacing it with the production train 200, while at all times maintaining a substantially constant pressure in the borehole 20. The controller 400 can be configured to control operation of the robotic system (not shown) in the multivessel pressure vessel system 194 to lift the drill train and disassemble and separate it into distinct drill train sections; and, when that is completed, to assemble and lower the production train 200 into the borehole 20.

In an embodiment, the controller 400 can be configured to control or operate characteristics of all fluid flowing into and out of the borehole 20, including the rate of flow of pressurized gas (for example, carbon dioxide or nitrogen) and/or liquid (for example, water or supercritical fluid). The controller 400 can be configured to control characteristics of all fluid flowing in or out of the borehole 20, including the rate and volume of flow as a function of time, including the rate of flow of fluid into the borehole 20, for example, by controlled operation of the high-pressure pump 144, inlet pressure control valve system 148, and/or outlet pressure control valve system 140.

By adjusting and controlling the rate of flow and pressure of fluids (liquid or gas) injected into and outlet from the borehole 20, the controller 400 can adjust and control the overall flow and pressure in the borehole 20. The injected fluid can include ultra-pressurized gas or water. The outlet fluid can include supercritical fluid. The term "fluid," as used in this disclosure, means gas, liquid, or any combination thereof.

The controller 400 can include a sensor system comprising one or more sensors. The controller 400 can include an interface that connects to one or more external sensors. The sensor can include, for example, a pressure sensor, a temperature sensor, a humidity sensor, a gas sensor, a seismometer, or a water sensor. The controller 400 can be configured to control any process or methodology described herein, including operation of the robotic system (not shown) in the multivessel system 194 in extracting and disassembling the drill train and assembling and installing the production train 200.

The outlet pressure control valve system 140, fluid pump 144, inlet pressure control valve system 148, and shutoff valve system 145 can be configured to remain in place and seal the borehole 20 from the surrounding environment after the drill train is removed and replaced by the production train 200. The above-ground structure of the PTI system 10 (shown in FIGS. 1-3) can be removed after installation of the production train 200 in the borehole 20.

Referring to FIGS. 2 and 3, the downstream (or lower-most) pressure vessel 173 can be connected to a fixed bottom gate valve 192, a fixed hydraulic (drill and/or) production train conical clamping mechanism 193, and the IO flow separator 146. The pressure vessels 171, 172, or 173 can include a smooth bore cylinder with an interior piston with drill pipe connector sealing clamp providing complete separation and ejection of burn gases from the system and can be positioned such that its longitudinal axis is aligned with the longitudinal axis of the borehole 20. The pressure vessel 173 downstream opening can be positioned such that the drill train can be extracted from the borehole and, after completion of the extraction process, the production train 200 can be lowered from the downstream multivessel 173 and pass through the gate valve 192, a sliding hydraulic clamping mechanism 193, and the IO flow separator 146 unobstructed.

In the multivessel system 194 comprising the three pressure vessels, at least two of the drilling pressure vessels can each be configured with an internal spiral hydraulic ball screw sled (or elevator) 1905. The multivessel system 194 can include one or more robots (not shown), or the robots can be located external to the multivessel system 194. Each sled 1905 can be configured to move vertically in relation to the tower 170 (shown in FIG. 1). Each sled 1905, including clamping mechanisms 1940, can be operated by, or under the control of, a robot.

In an embodiment, the multivessel system 194 can include a plurality of rotating rod ball screws located near the internal diameter of two or more drilling pressure vessels and connected to the hydraulic ball screw elevators 1905, causing the hydraulic ball screw elevators 1905 to ascend or descend.

In certain embodiments, the clamping mechanisms in the multivessel system 194 can be configured to hold and disassemble the drill train into drill train sections during removal from the borehole 20, and connect and assemble the production train 200 during subsequent installation in the borehole 20.

The multivessel system 194 can be configured to hold at least one of the train section 210, the train connector 212, and the production train 200 by means of at least one pair of cone-shaped jaws that include a pressure sealing device imbedded in the pair of cone-shaped jaws. The sealing device can be configured to seal the pair of cone-shaped jaws against, for example, the train section 210, train connector 212, or production train 200. The sealing device can include a piston containing piston rings or other sealing mechanisms. The sealing device can be configured to press and/or rotate the train section 210 or train connector 212 together as they are connected to one another, forming a gas seal or slide one over the other to be pocket and circumferentially welded together to form a gas seal.

In an embodiment, the clamping mechanisms can include at least one pair of cone-shaped jaws located in the downstream pressure vessel 173 or center pressure vessel 172. The cone jaws can be affixed to a gas separator piston 1944 and configured to squeeze and seal on the train section 210 or the train connector 212. The gas separator piston 1944 can be configured to seal any one or more of a drill tube, a waveguide, a waste gas extraction tube, a water cooling tube, an electrical supply cable and a ceramic infusion area inside of the vertically moving piston 1944 during, for example, extraction of the drill train. The gas separator piston 1944 can be configured to, at the same time, seal the exhaust gases rising from a well burn from the drill tube, waveguide and ceramic infusion area incoming gases. In an embodiment, at least one (or all) of the pressure vessels in the multivessel system 194 can be configured to allow the exhaust gases to exit through the gas flow separator 146 and not mix with incoming nitrogen purge gas which travels down the interiors of the drill train.

Figure 6:
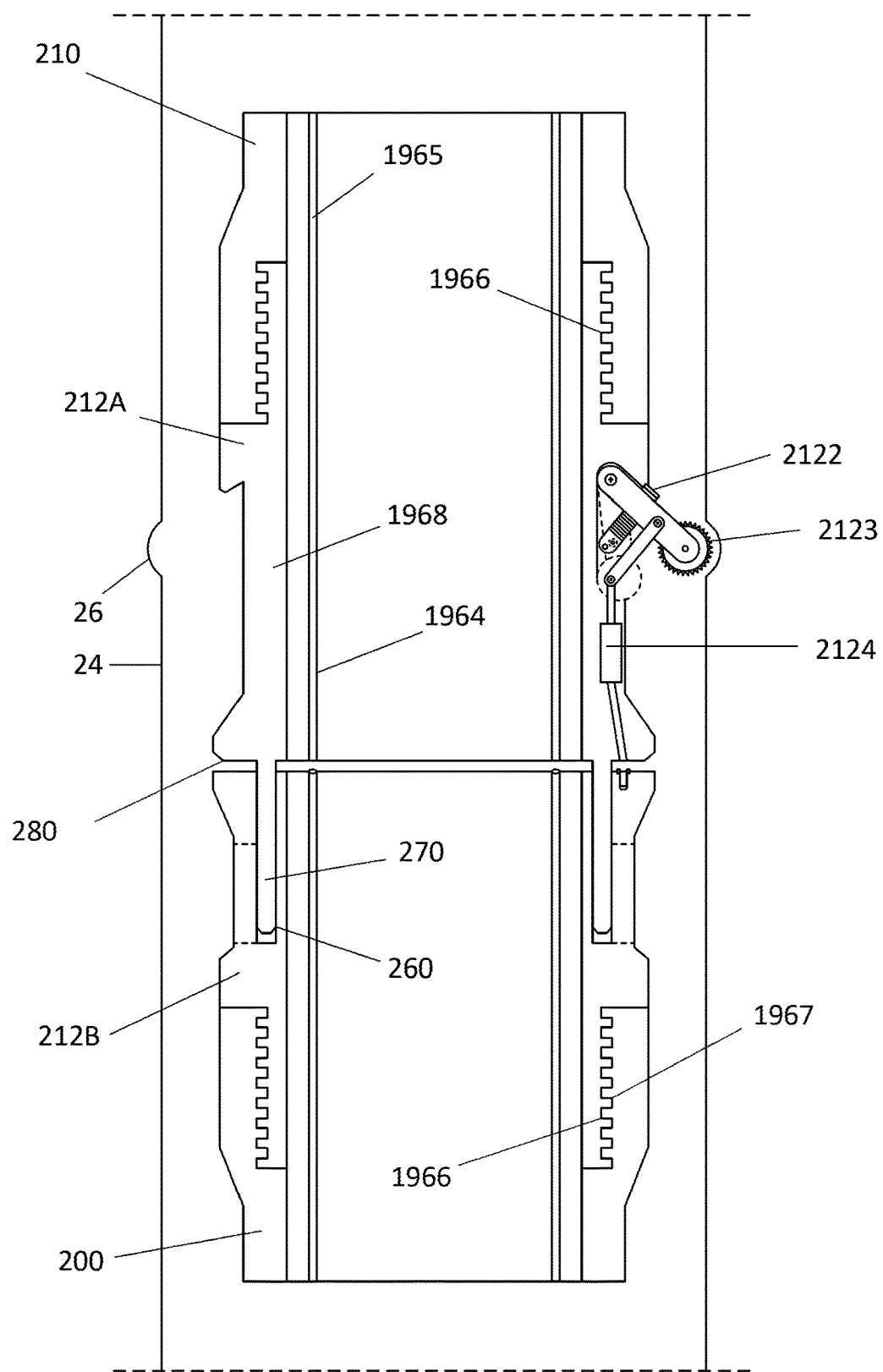
FIG. 6 depicts a cross-cut view of a portion of an embodiment of a production train connector with centering and gripping arms with a slide over plug and circumferentially welded connection.

Each hydraulic ball screw sled 1905 can be configured with a plurality of hydraulic conical clamping mechanisms 1940 for clamping at least one of the production train 200, the train connector 212, or the train section 210. In an embodiment, the clamping mechanisms 1940 can be configured to separately clamp and manipulate each section of the train connector 212, including, for example, the upstream sub-connector 212A, the downstream sub-connector 212B, any attachment mechanisms (for example, bolts), and a welder that can be operated to weld a circumferential pressure seal around the perimeter of the connector 212, at the junction of the upstream and downstream sub-connectors 212A, 212B as shown in FIG. 6.

In various embodiments, the hydraulic ball screw sled 1905 and the plurality of clamping mechanisms can be configured for retaining the train section 210, the connector 212 or the production train 200 when lowering the production train 200 into the borehole 20 at a pre-determined speed, which can be controlled remotely by the controller 400 based on, for example, radar distance measurements.

In various embodiments, any one or more of the pressure vessels 171, 172 and 173 can comprise machined concentric rings configured internally to accept ball bearings. In an embodiment, at least two of the pressure vessels 171-173 can be configured with a plurality of pipes, at least one pipe located internal to each pressure vessel machined on the exterior of the pipe with concentric rings to accept the ball bearings, allowing the pipe to rotate, for example, inside the upstream and center pressure vessels 171 and 172. The rotatable pipe can include a lower thrust bearing located at the bottom of each pressure vessel 171 and 172 to handle compressive loads. Each of the plurality of pipes can include a worm gear at the top to be hydraulically or electrically driven to control movement of the hydraulic ball screw sleds 1905 within the two or more pipes. The plurality of pipes configured with internal ball screw threads in a spiral can be configured to permit precise vertical movement of the hydraulic ball screw sleds 1905.

In an embodiment, at least two pipes can each be configured with internal spiral ball bearing grooves to control movement vertically of the traveling hydraulic ball screw sled 1905. The traveling hydraulic ball screw sled 1905 can be configured with external spiral ball bearing grooves. At least two of the plurality of pipes can be configured to be rotatable by the hydraulic motor or electric motor 1908 and a gear set so that when a gear motor is activated, the pipe turns in the clockwise or counter clockwise direction, causing the traveling hydraulic ball screw sled 1905 to descend or to ascend inside at least one of the two or more pressure vessels 171-173 providing precise control of travel of the production train 200, including velocity.

At least one of the pressure vessels 171-173 can include a smooth internal cylinder bore in a pressure vessel tube 1943 and the piston 1944 with pressure sealing piston rings 1945 and a pipe pressure sealing clamp. The pressure vessel tube 1943 can be made of Hastelloy X or other nickel-alloy material. The piston 1944 can be connected, by an internal connecting pipe 1941, to the pressure sealing hydraulic clamp mechanism 1940, which can be attached to the sled 1905 in, for example, the center pressure vessel 172. The connecting pipe 1941 can include a fixed steel tube. This configuration can cause the piston 1944 to move in, for example, the downstream pressure vessel 173 in unison with the sled 1905 in the center pressure vessel 172.

In an embodiment, the multivessel system 194 can include an upper end of the downstream vessel 173 connected or bolted to the lower end of the center pressure vessel 172 to provide a continuation of the same internal diameter of the pressure vessels, but configured with a smooth cylinder bore, instead of, for example, a ball bearing race. In an embodiment, the upstream pressure vessel 171 can be configured with a ball bearing race. The downstream pressure vessel 173 can have a smooth cylinder bore equipped with the piston 1944 with piston rings 1945 and a pressure sealing vice clamp, which can be attached to the elevator 1905 of the adjacent pressure vessel by a connecting pipe, as seen, for example, in FIG. 3. The piston 1944 can seal the upcoming burn gases from the incoming nitrogen purge gas. The piston 1944 can have a vertical center hole in it which allows a train section 210 to pass through it, providing a continuous feed mechanism for these units proceeding down into the well bore. A second pressure seal can be provided by a hydraulic vice clamp located on the bottom of the bottommost pressure vessel piston sealing against piston rings located on the train section 210 or train connector 212. This arrangement can provide a continuous feed of the production train 200 into (or the drill train out of) the well bore while maintaining very high continuous gas pressure in the wellbore to resist lithostatic and hydrostatic pressures in the lower borehole, allowing drilling to depths never before achieved without this system.

The downstream pressure vessel 173 can be affixed to or include the IO flow separator 146. The IO flow separator 146 can include, or be affixed to, a fixed hydraulic conical clamping mechanism 1461, a fixed hydraulic drill/production train conical clamping mechanism 1462, and a gas flow separator 1463. The clamping mechanism 1461 can be located between the bottom of the downstream pressure vessel 173 and the gas flow separator 1463.

In an embodiment, the IO flow separator 146 can comprise a high temperature metal or carbon fiber ceramic material. The IO flow separator 146 can be securely attached to the well-cap casting and/or the metal well seal. The IO flow separator 146 can be configured to direct the burn gases through the outlet flow control valve system 140, which can include a well gas pressure and flow regulator valve, working in unison with the inlet pressure control valve system 148, which can include an input pressure and flow control valve at the top of the borehole 20 to precisely control borehole pressure and gas flow rate in the entire borehole 20. In an embodiment, the outlet and inlet flow control valve systems 140, 148 can be located below the IO flow separator 146 such that the IO flow separator 146 can be removed and the valve systems 140, 148, can remain in place and can be used in the geothermal harnessing phase, after the well bore is completed and the production train 200 installed.

As seen in the cross-section cut views depicted in FIGS. 2 and 3, the downstream pressure vessel 173 can include a vessel housing 1910 having a production train channel 1912. In an embodiment, the entire multivessel system 194 can be placed in the vessel housing 1910, which can be reinforced, for example, by a carbon-fiber or carbon-fiber ceramic wrapping. In another embodiment, each pressure vessel 171-172-173 of the multivessel system 194 can be placed in its own vessel housing 1910. A gate valve 192 can be positioned at each end of each pressure vessel, including, for example, at the upper (or lower) end of the upstream pressure vessel 171, the upper (or lower) end of the center pressure vessel 172, or the upper (or lower) end of the downstream pressure vessel 173 and arranged to hermetically seal one or more of the pressure vessels 171-172-173 individually or together with another pressure vessel 171-172-173 in the multivessel system 194.

The vessel housing 1910 can comprise a composite of nickel alloy and a ceramic/carbon fiber material. In an embodiment, the nickel alloy vessel housing 1910 can be wrapped with carbon fiber/ceramic around each pressure vessel in the multivessel system 194. In an alternative embodiment, each pressure vessel and/or the entire multivessel system 194 can be constructed with the vessel housing 1910 being wrapped in carbon fiber/ceramic providing an outer layer of the multivessel system 194.

Any one or more of the pressure vessels in the multivessel system 194 can include the hydraulic or electric worm gear motor 1908, which can be configured to drive the internal hydraulic ball screw clamping sled 1905 upward or downward in the train channel 1912. The motor 1908 can be controlled by, or under the operation of, the controller 400.

In various embodiments, the multivessel system 194 can include any combination of a hydraulic worm gear drive, a worm gear-powered rotating sleeve, screw ball bearing rings (descending or ascending) 1932, a spiral ball race 1934, a hydraulic driven rotating spiral grooved tube 1935, flat ball bearing rings 1936, a flat ball bearing race, a spiral ball bearing grooved Hastelloy X pressure vessel tube 1938, a worm gear ring, the pressure vessel clamp 1940, the connecting pipe 1941, ball bearings 1942, a smooth bore Hastelloy X pressure vessel tube 1943, piston 1944 with tapered production tube clamp with piston rings 1945, a screw plug (to install roller bearings) 1946, anti-rotational slide bars 1947, Rotec thrust bearing 1948, and O-ring seals 1949.

As seen in FIGS. 1-3, the multivessel system 194 can be located above ground in the tower 170. Each pressure vessel 191 in the multivessel system 194, as well as the production train 200, including all train connectors 212, can be configured to maintain a constant high pressure as additional train sections 210 are added to the production train 200. Any of the pressure vessels 171-173 in the multivessel system 194 can be configured to be pressurized or depressurized independently of any other pressure vessel by, for example, operation of the one or more high-pressure gate valves 192 attached to the pressure vessels.

For instance, the upstream pressure vessel 171 can be depressurized and two new 26.5-foot or one 53-foot train section 210 can be inserted. Then, the upstream gate valve 192 on the upstream end of the upstream pressure vessel 171 can be closed. The gate valve 192 between the upstream vessel 171 and the center vessel 172 can be opened, pressurizing both pressure vessels. As discussed above, each pressure vessel can be equipped with an internal mechanism that can be operated with hydraulic ball screws to raise and lower the hydraulic sled (or elevator) 1905 with the pipe clamping system 1940, such that the production train 200 can be controllably moved or maintained at a precise speed or distance in the borehole 20.

Referring to FIG. 3, when the sled 1905 is at the bottom of its stroke in the pressure vessel 172, the power can be turned off and the downstream pressure vessel 173 will maintain the pressure along with the entire borehole 20. Then, the gate valve 192 between the upstream pressure vessel 171 and the middle pressure vessel 172 can be closed and the upper gate valve 192 on the upstream pressure vessel 171 can be opened, depressurizing the upper pressure vessel 171 to add another train section 210, while the downstream pressure vessel 173 remains closed and in pressure equilibrium with the borehole 20. Once the entirety of the train section 210 is in the upstream pressure vessel 171, the uppermost gate valve 192 can be closed and all of the pressure vessels pressurized. The train section 210 can be connected to the production train 200. The entire process can be handled autonomously by the controller 400 and the robotic system, repeating the process for each train section 210 as production train 200 is lowered into the borehole 20.

Components in the embodiments of the multivessel system 194 depicted in FIGS. 2 and 3 can be interchangeable. As seen in the embodiment depicted in FIG. 2, the downstream pressure vessel 173 can include a vessel base. The vessel base can include a base pressure casting. The vessel base can include the hydraulic clamp motor 198. The downstream pressure vessel 173 can include the gate valve 192 positioned at the upper end of the pressure vessel and arranged to hermetically seal the downstream pressure vessel 173 with the borehole 20. The vessel base can be affixed to the IO flow separator 146.

In an embodiment, a second gate valve 192 can be included and positioned at the bottom end of the downstream pressure vessel 173. The second gate valve 192 can be affixed to, or incorporated into, the vessel base.

The vessel base can be attached to, or it can be formed as part of, the vessel-foundation connector. In an embodiment, the vessel base is bolted to the vessel-foundation connector, which in turn is fixedly attached to the well foundation 180.

In various embodiments, each pressure vessel 171-173 in the multivessel pressure vessel system 194 can have a similar or substantially the same structure, or any one or more of the pressure vessels can be structured or configured different from the other pressure vessel(s) in the multivessel system 194.

In an embodiment, the clamping sled 1905 can include a plurality of anti-rotational slide bars 1947, each of which can be configured to counteract any rotational forces applied to the clamping sled 1905 to keep the clamping sled from rotating with respect to the vertical axis (for example, the longitudinal axis of the borehole 20). The clamping sled 1905 and/or clamping mechanism(s) 1940 can be coupled to the worm gear, a ball screw elevator or other drive mechanism, which can be driven by the motor 1908 to move the clamping sled 1905 up/down in the pressure vessel 171, 172, or 173. The anti-rotational slide bars 1947 can guide the clamping sled 1905 as it travels up/down along the internal height of the pressure vessel in tow with the train section 210 or the production train 200.

In an embodiment, the motor 1908 can be configured to engage and drive a worm gear ring such that a worm gear turns and drives the rotating sleeve and/or clamping sled 1905 upward or downward in the pressure vessel 171, 172, or 173, along the longitudinal axis of the multivessel system 194.

The multivessel system 194 includes an upstream opening at a top end of the upstream pressure vessel 171 that provides access to the train channel 1912, allowing the train section 210 to pass through the opening into the channel 1912 unobstructed. The upstream opening can be aligned with and positioned such that the channel 1912 can be accessed through the gate valve 192, allowing the train section 210 to pass through the opening and gate valve 192 unobstructed. The upstream opening can be configured to allow the production train 200, including train section connectors 212 to pass through unobstructed.

In various embodiments, a gate valve 192 can be positioned at each end of each pressure vessel 171, 172, 173, to hermetically seal the pressure vessel from an adjoining pressure vessel, the borehole 20, or the surrounding atmosphere.

In various embodiments, one or more pressure vessels 171-172-173 and/or gate valves 192 can be added the multi-vessel pressure vessel system 194. Each gate valve 192, individually or in combination with one or more other gate valves 192, can be configured to seal and adjust or maintain a predetermined pressure inside each pressure vessel, independent from the other pressure vessel(s) 171-172-173, the borehole 20 or the surrounding atmosphere.

In the embodiment, the outlet pressure control valve system 140 can include a well bore outlet (or exit) flow control valve and/or the outlet shutoff valve 145. The inlet pressure control valve system 148 can include the purge gas inlet valve 125 and an inlet flow control valve. The inlet pressure control valve 148 can include an inlet shutoff valve (not shown) and a drill/production tube pressure reduction control valve.

Each pressure vessel 171, 172, 173 can include a gas inlet valve 125, each of which can be connected between the respective pressure vessels (as seen in FIG. 3) and the purge gas supply line 122 to inject ultra-pressurized gas into the pressure vessels. The gas inlet valve 125 can be located downstream of the gate valve 192. The controller 400 can be configured to close the gate valve 192 before opening the gas inlet valve 125 to inject pressurized gas into the pressure vessel, to avoid releasing the pressurized gas into the surrounding environment. Similarly, the controller 400 can be configured to close the gas inlet valve 125 before opening the upstream gate valve 192.

In an embodiment, the train connector 212 can include a plurality of sub-connectors that can be installed between adjacent train sections 210 to form the production train 200. The train connector 212 can include a material such as Hastelloy X or other nickel-alloy. The train connector 212 can include an upstream sub-connector and a downstream sub-connector, which can be attached to each other, the train section 210 or the production train 200. The sub-connectors can be attached using, for example, bolts or threaded-coupling or welded in the production train 200.

The train connector 212 can be configured to be assembled in the multivessel system 194. In an embodiment, the downstream sub-connector can be affixed, by the robotic system (not shown), to the top of the production train 200 in one of the pressure vessels in the multivessel system 194. At the same (or a different) time, the upstream sub-connector can be affixed, by the robotic system, to the bottom of the incoming train section 210 that is to be coupled to the production train 200. In embodiments, the production train 200 can be either stationary or moving while the sub-connectors are secured to the train section 210, each other, or the production train 200.

The downstream sub-connector can have a cylindrical shape with a grooved section at the downstream end. The grooved section can be carbon fiber bonded at the carbon fiber bonding area to the carbon fiber ceramic shell at the top of the drill train 200.

The upstream sub-connector can have the same shape as the downstream sub-connector (for example, cylindrical shape) with a grooved section at the upstream end. On the opposite, downstream end, the sub-connector can comprise the engagement member. The engagement member can include a lip. The grooved section can be carbon fiber bonded at a carbon fiber bonding area to a carbon fiber ceramic shell of the train section 210.

Each of the sub-connectors can include an electroplated Hastelloy X or other nickel-alloy wave guide tube, a connector housing, and a graphene super insulation sandwiched between the tube and the housing. The tube can include, for example, a gold electroplating, a silver electroplating, or a copper electroplating. The connector housing can include Hastelloy X or other nickel-alloy.

In an embodiment, the train section 210, sub-connectors, and production train 200 can be, for example, wrapped in super insulating graphene with a protective layer of nickel alloy foil and thermally sprayed nickel alloy, which can be added under a nitrogen blanket providing a high temperature nickel alloy protective coating during manufacture.

Figure 5:
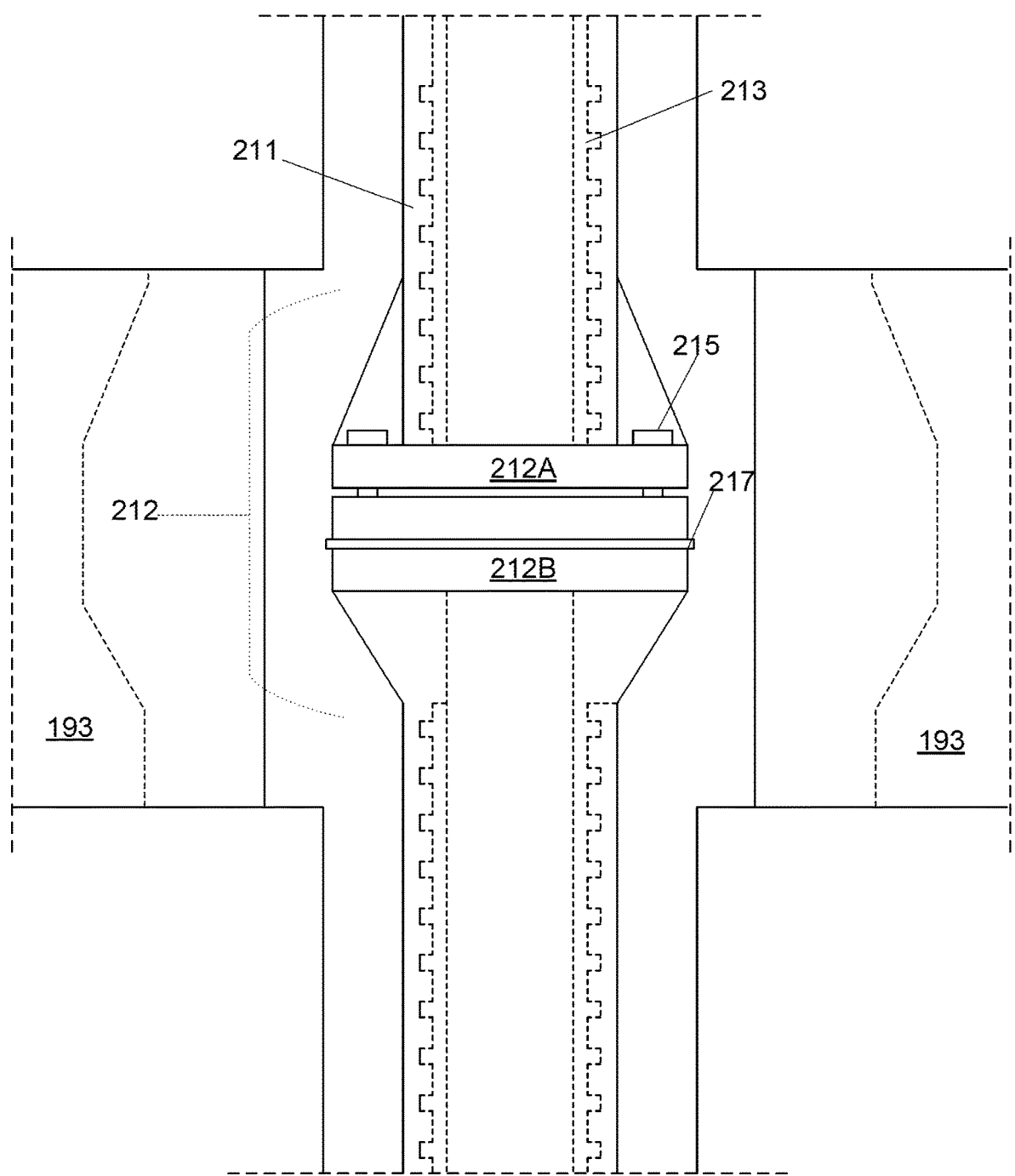
FIG. 5 depicts a cross-cut view of a portion of an embodiment of a production train connector.

In an embodiment, the train connector 212 can include upper and lower Hastelloy X, high temperature nickel alloy or carbon fiber ceramic sub-connectors 212A, 212B (shown in FIG. 5 or 6). The sub-connectors 212A, 212B can have a conical area that allows the matching conical area of the plurality of clamping mechanisms to engage the sub-connectors and prevent the production train 200 from falling into the borehole 20 and, at the same time, engaging high-pressure gas seals configured on the sub-connectors while pressing the sub-connectors together. The clamping mechanism can be configured with internal contours that, when fully closed, allow the train section 210 or production train 200 to pass through, but not the conical portions of the sub-connectors. The upstream and downstream (or upper and lower) sub-connectors 212A, 212B can be joined by a ring of Hastelloy X or high temperature nickel alloy bolts or a pipe thread connection that is robotically set and torqued or in the production train robotically plug and circumferentially welded while within the multivessel system 194.

In an embodiment, nickel alloy connectors can be used, which can include carbon fiber/ceramic tubes having concentric grooves at each tube connection area to form a strong attachment to the carbon fiber/ceramic train section 210.

The production train 200 includes, and is formed by, a plurality of train sections 210, each of which can be connected to an adjacent train section 210 with a production train connector 212. The train connector 212 can include a plurality of sub-connectors 212A, 212B. The train connector 212 can include, for example, a Hastelloy X or other high temperature nickel alloy. In an embodiment, the train connector 212 can include, for example, bolts or threaded connectors or slide over weldable sleeve connectors.

The length of the production train 200, which in an embodiment comprising 53-foot-long train sections can have 1,132 train sections, or more, for a borehole depth of 60,000 feet deep, or deeper.

In an alternative embodiment, each train section 210 can be 26.5 feet long. Other lengths are also contemplated here, including lengths less than 26.5 feet and greater than 53 feet. The length of the train section 210 can be determined based on, for example, the delivery mechanism (for example, standard 53-foot trailer) used to deliver the train sections 210.

In an embodiment, the production train 200 can include a plurality of super-insulated train sections 210. The production train 200 can include train connectors 212, which can be plug welded and circumferentially welded robotically to create a pressure seal as the production train 200 is lowered into the borehole 20.

In an embodiment, the train sections 210 can be connected to each other, for example, via threading, without train connectors 212. Adjacent train sections 210 can be plug welded and circumferentially welded robotically to create a pressure seal as the production train 200 is lowered into the borehole.

FIG. 5 depicts a cross-cut view of a portion of an embodiment of the production train 200 in the sliding hydraulic clamping mechanism 193. As seen, the clamping mechanism 193 can open to allow the production train 200 to pass therethrough unobstructed. The clamping mechanism 193 can also be configured to close and securely hold the production train 200, preventing it from moving. The same clamping mechanism 193 can be used to hold the drill train during the extraction process. In the embodiment, the production train 200 can include a carbon fiber/ceramic tube 211. Each train section 210 can include a grooved Hastelloy X or other nickel alloy tube. Adjacent train sections 210 can be connected by the train connector 212, which can include the upstream sub-connector 212A and a downstream sub-connector 212B. The train connector 212 can include a pressure seal part 217. In an embodiment, the sub-connectors 212A, 212B can be made of a material comprising Hastelloy X or Nickel alloy. In an embodiment, the upstream and downstream sub-connectors 212A, 212B can be affixed to each other by fasteners 215, such as, for example, bolts.

In an embodiment, the train connector 212 can have a plurality (for example, 3 or more) spring-loaded roller claw tipped arms 2121 (an example shown in FIG. 6) embedded in their sides that can operate to center the production train 200 in the borehole 20 and add additional support.

In an embodiment, the train section 210, sub-connectors 212A, 212B, and the production train 200 can be super-insulated with fine particles encapsulated in a chamber surrounding the core and sealed to the borehole wall 24 surrounding the channel for sustaining a vacuum applied to the channel.

Figure 12:
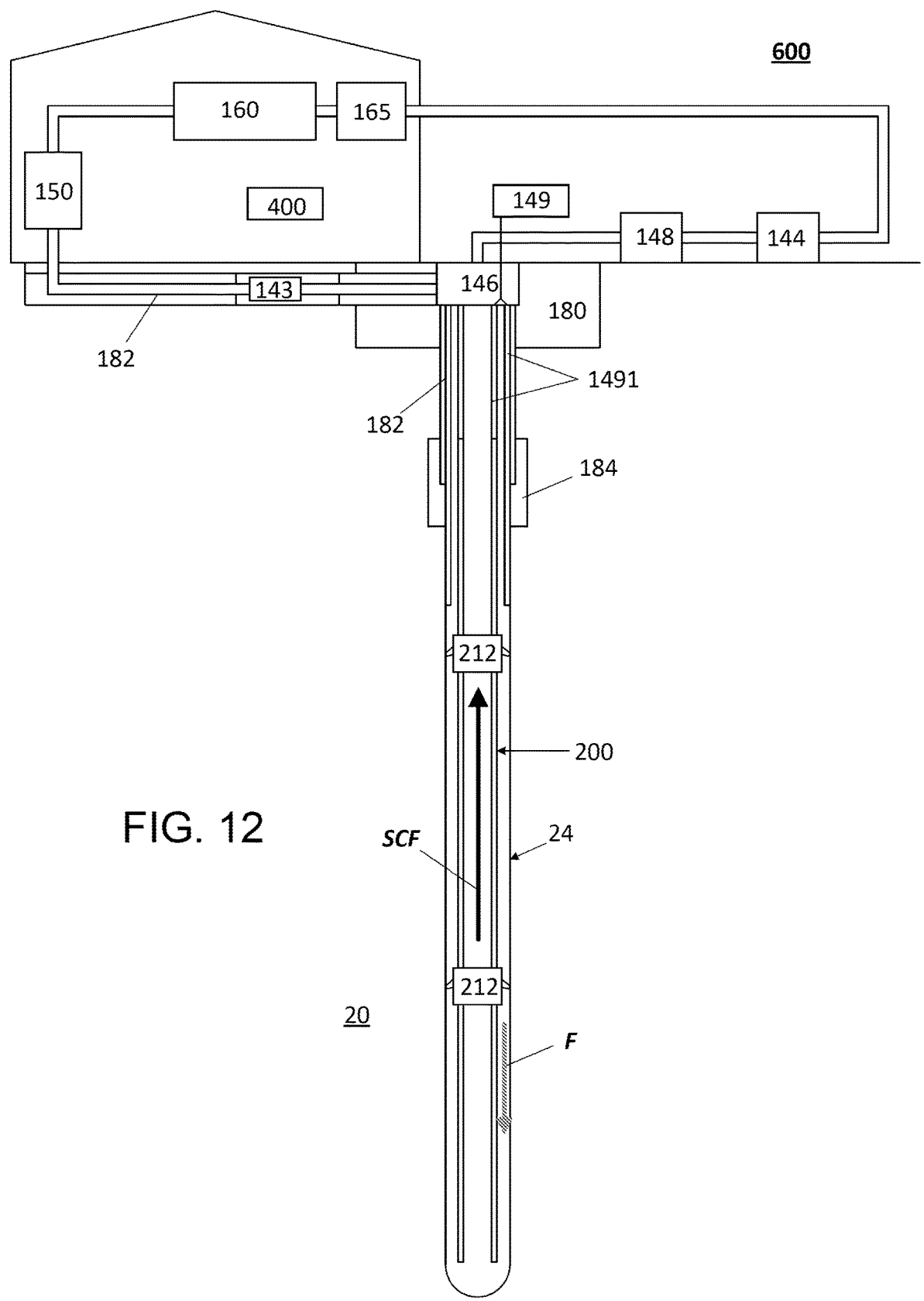
FIG. 12 depicts an embodiment of a geothermal energy harnessing (GEH) station.

In various embodiments, the connector 212 can be connected between adjacent train sections 210, or it can be connected intermittently between portions of the production train 200, with each portion having a plurality of train sections 210, each connected directly to the other, as seen in the embodiment depicted in FIG. 12.

FIG. 6 depicts a cross-cut view of a portion of an embodiment of the train connector 212. In various embodiments, the sub-connector 212A or 212B can include three or more hydraulically, pneumatically or mechanically actuated arms with claw tipped rollers which are extendable to the wall of the borehole 20 and are lockable in the extended position when making contact with the borehole 20 using a ratchet detent mechanism and may seat into indentations in the borehole walls when activated so as to provide mechanical support to the installed drill train 200 and to center the drill train 200 in the borehole. The sub-connectors 212A or 212B can include conical projections enabling them to engage the hydraulic elevator clamps on the sled 1905 in the multivessel system 194, thereby allowing the production train 200 to be lowered into the borehole 20 without slipping. The sub-connectors 212A, 212B can be joined by one sliding over the other, and then robotically plug welding slits in the sub-connectors 212A, 212B. The sub-connectors 212A, 212B can then be robotically circumferentially welded together to complete a pressure seal.

The train connector 212 can include one or more extendable well pressure vessel claw arm systems 2121, each of which can be configured to engage an indentation 26 in the borehole wall 24. In an embodiment, the train connector 212 includes at least three spring-loaded roller claw tipped arms 2121 embedded in the connector, each being remotely actuatable by hydraulic or pneumatic cylinders 2124 or a tension pull rod to release the spring-loaded arms with a ratchet detent system to center the fully installed production train in the borehole 20 and support the weight of the entire production train system after being fully installed.

In an embodiment, the claw arm system 2121 can be located on either the upstream sub-connector 212A or the downstream sub-connector 212B. The claw arm system 2121 can include a detent (for example, ratcheted detent) 2122, a toothed borehole gripper 2123, and the pressure activated cylinder 2124. In an embodiment, the PTI system 10 can be configured to slow down or temporarily stop, for example, at 53-foot intervals, to burn an indentation 26 in the borehole wall 24 during drilling provide a gripping ledge for the extendable well pressure vessel claw arms 2122.

The train connector 212 can be configured to be assembled in the multivessel system 194 (shown in FIGS. 1-3). In an embodiment, the downstream sub-connector 212B can be affixed, by the robotic system (not shown), to the top of the production train 200 in one of the pressure vessels 171-173 in the multivessel system 194. At the same (or a different) time, the upstream sub-connector 212A can be affixed, by the robotic system, to the bottom of the incoming train section 210 that is to be coupled to the production train 200. The upstream sub-connector 212A can be moved downward and engaged with the downstream sub-connector 212B such that an engagement member 270 of the sub-connector 212A enters and securely engages a plug weld slot 260 in the downstream sub-connector 212B, as seen in FIG. 6. In embodiments, the production train 200 can be either stationary or moving while the sub-connectors 212A, 212B are secured to the train section 210, each other, or the production train 200. Once fully and securely engaged, the robotic system can weld the plug weld slot 260 to fixedly secure the sub-connectors 212A, 212B to each other. The junction area between the sub-connectors 212A, 212B can be welded around the entire perimeter with a circumferential weld 280 to provide a pressure seal.

The downstream sub-connector 212B can have a cylindrical shape with a grooved section at the downstream end, as seen in the embodiment depicted in FIG. 6. At the opposite, upstream end, the sub-connector 212B can comprise the plug weld slot 260, which can be configured to receive and mate to the engagement member 270 of the upstream sub-connector 212A. The grooved section can be carbon fiber bonded at the carbon fiber bonding area 1966 to the carbon fiber ceramic shell 1967 at the top of the production train 200.

The upstream sub-connector 212A can have the same shape as the downstream sub-connector 212 (for example, cylindrical shape) with a grooved section at the upstream end. On the opposite, downstream end, the sub-connector 212A can comprise the engagement member 270. The engagement member 270 can include a lip. The grooved section can be carbon fiber bonded at a carbon fiber bonding area 1966 to a carbon fiber ceramic shell 1967 of the train section 210.

Each of the sub-connectors 212A, 212B can include an electroplated Hastelloy X or other nickel-alloy wave guide tube 1965, a connector housing 1968, and a graphene super insulation layer 1964 sandwiched between the tube 1965 and the housing 1968. The tube 1965 can include, for example, a gold electroplating, a silver electroplating, or a copper electroplating. The connector housing 1968 can include Hastelloy X or other nickel-alloy.

In various embodiment, the production train 200 can include one or more sensors (not shown), including a temperature sensor, a pressure sensor, or a gas sensor. The sensor(s) (not shown) can be connected via one or more communication links to the controller 400 (shown in FIG. 1), which can be configured to receive sensor signals and monitor and log conditions in the borehole 20, including, for example, information regarding pressure, temperature, and types, quantities and concentrations of gases in the borehole, including at various depths of the borehole 20.

The production train 200, including train connectors 212, can comprise a light weight, high-strength material such as, for example, a light-weight carbon fiber ceramic or a carbon fiber-high temperature nickel alloy. The production train 200 can include a super-insulated graphene material.

Figure 7:
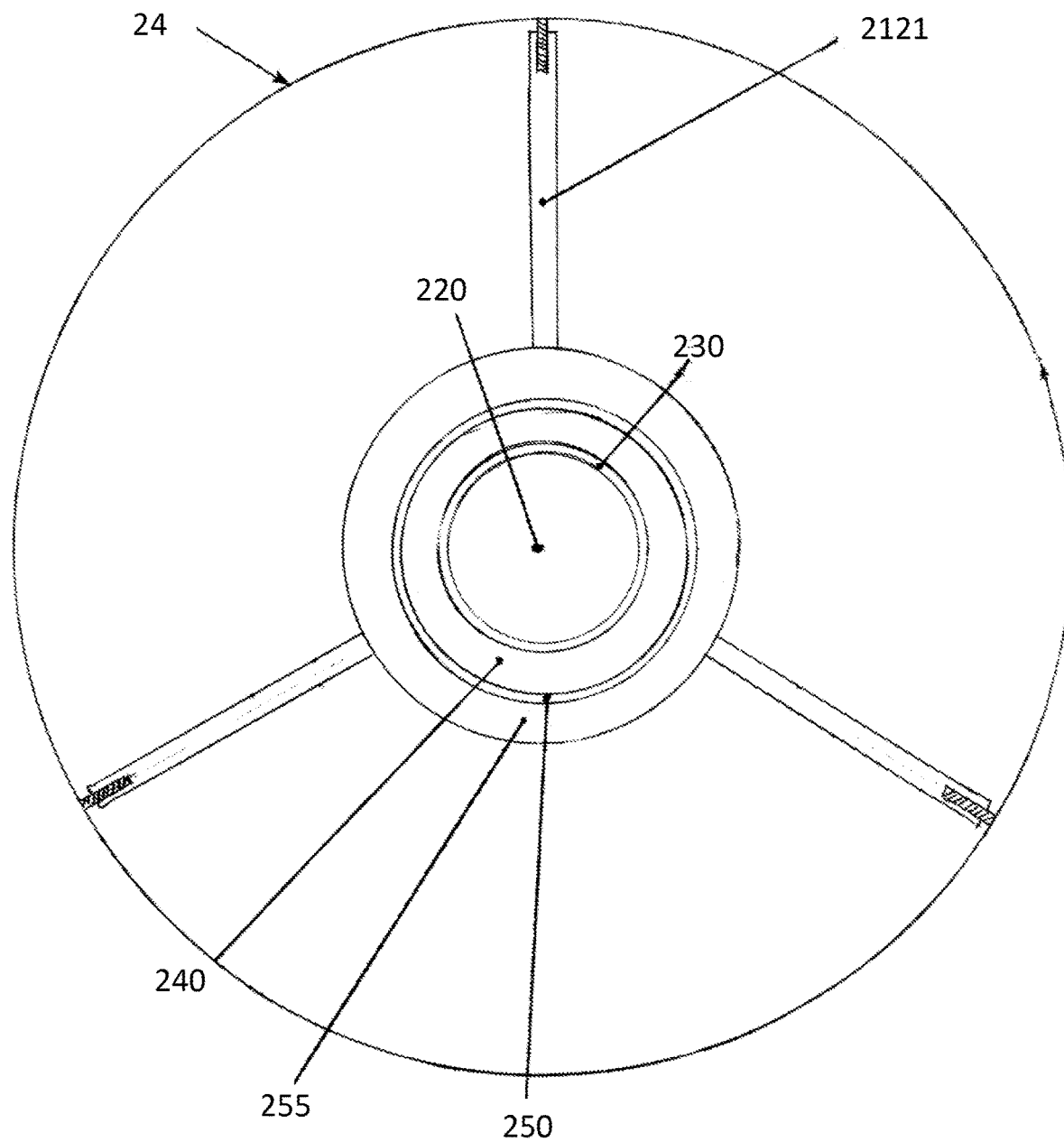
FIG. 7 depicts a cross-sectional top view of a portion of the production train with centering and gripping arms.

FIG. 7 depicts a cross-sectional top view of an embodiment of the production train 200, including the train connector 212. In the embodiment, the production train 200, including train connector 212, can include a high-speed super critical fluid upflow pipe 220, a carbon fiber/ceramic super critical fluid pipe wall 230, a super-insulating graphene layer 240, a high temperature nickel alloy foil/arc spray coated 250, and a cone nickel alloy train connector 255.

Figure 8:
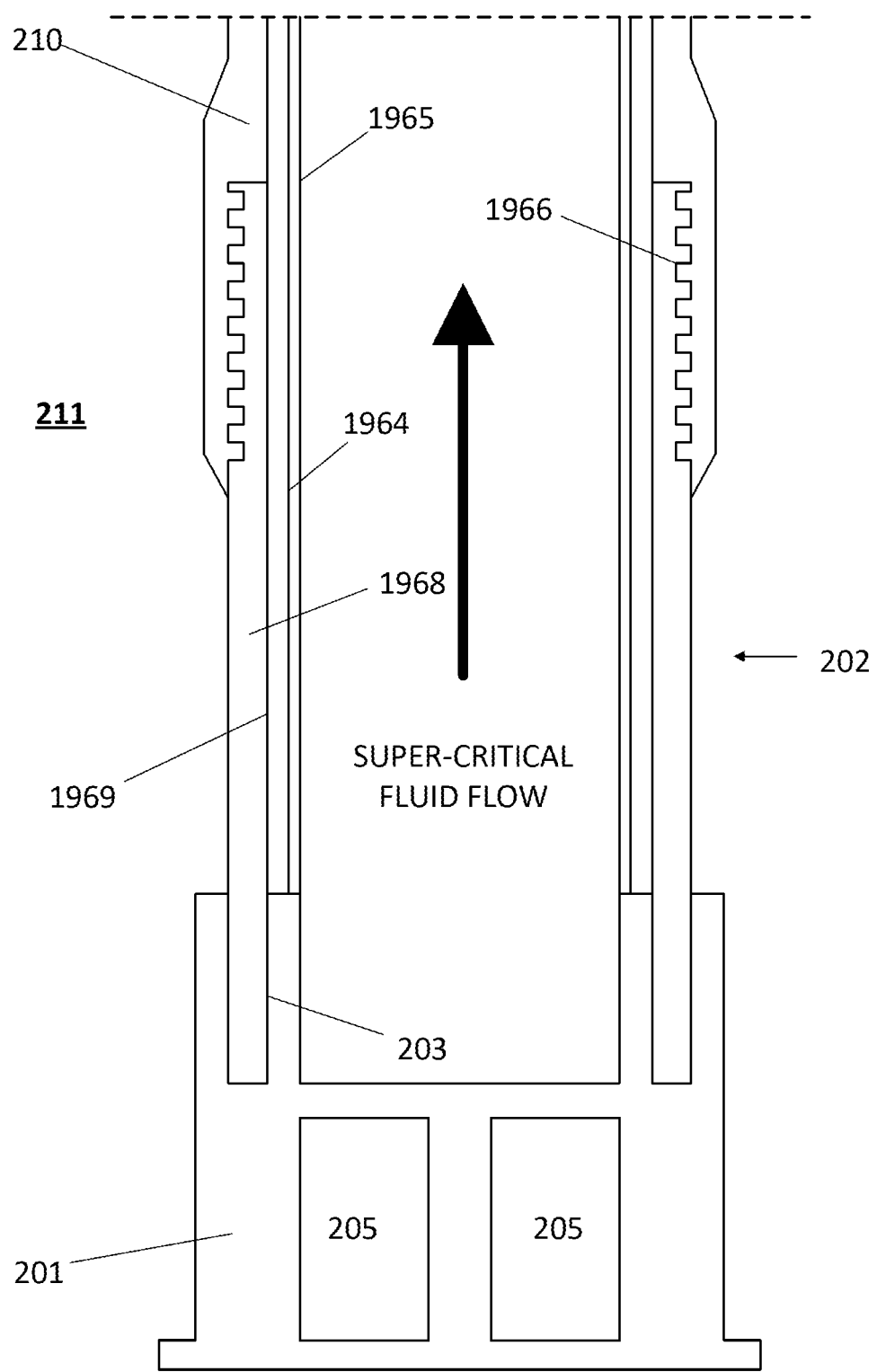
FIG. 8 depicts a cross-cut view of a lower end portion of a production train.

FIG. 8 depicts an embodiment of a train base section 211, which can be installed at the beginning, downstream end of the production train 200. The train base section 211 can be provided and installed in the multivessel system 194 (shown in FIGS. 1-3) as an end portion of the production train 200. The train base section 211 can include a production train base 201 and a grooved Hastelloy X or nickel alloy tube 202. The production train base 201 can include a base plug weld slot 203. The production train base 201 can include one or more super critical fluid openings 205. At the beginning of installation of the production train 200, the multivessel system 194 can begin with train base section 211 and connect an initial train section 210 (or train connector 212) to the upstream end of the train base section 211.

Figure 9:
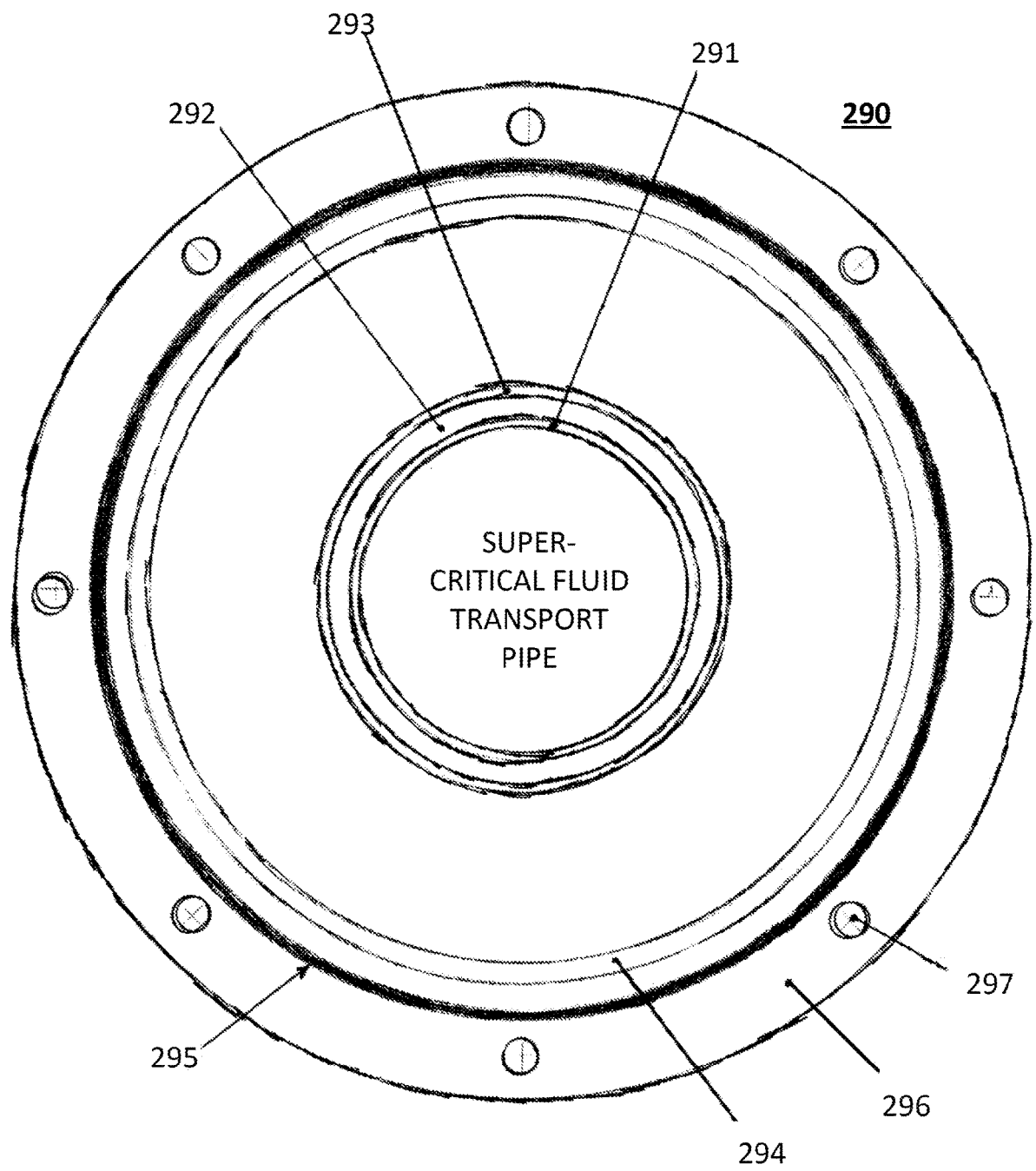
FIG. 9 depicts a cross-sectional top view of an embodiment of a production train insulated transport pipe.

FIG. 9 depicts a cross-cut view an embodiment of an underground super critical fluid transport pipe 290 that can be included from the borehole 20 to a geothermal energy harnessing plant (shown in FIG. 12). The transport pipe 290 can include a carbon fiber/ceramic super critical fluid pipe wall 291, a super insulating graphene layer 292, a high-temperature nickel alloy foil/arc spray coated with high-temperature nickel alloy protective coating 293, a carbon fiber/ceramic pipe wall 294, a high-temperature O-ring seal 295, a bolt and O-ring pipe flange 296, and a plurality of bolt holes 297.

Figure 10:
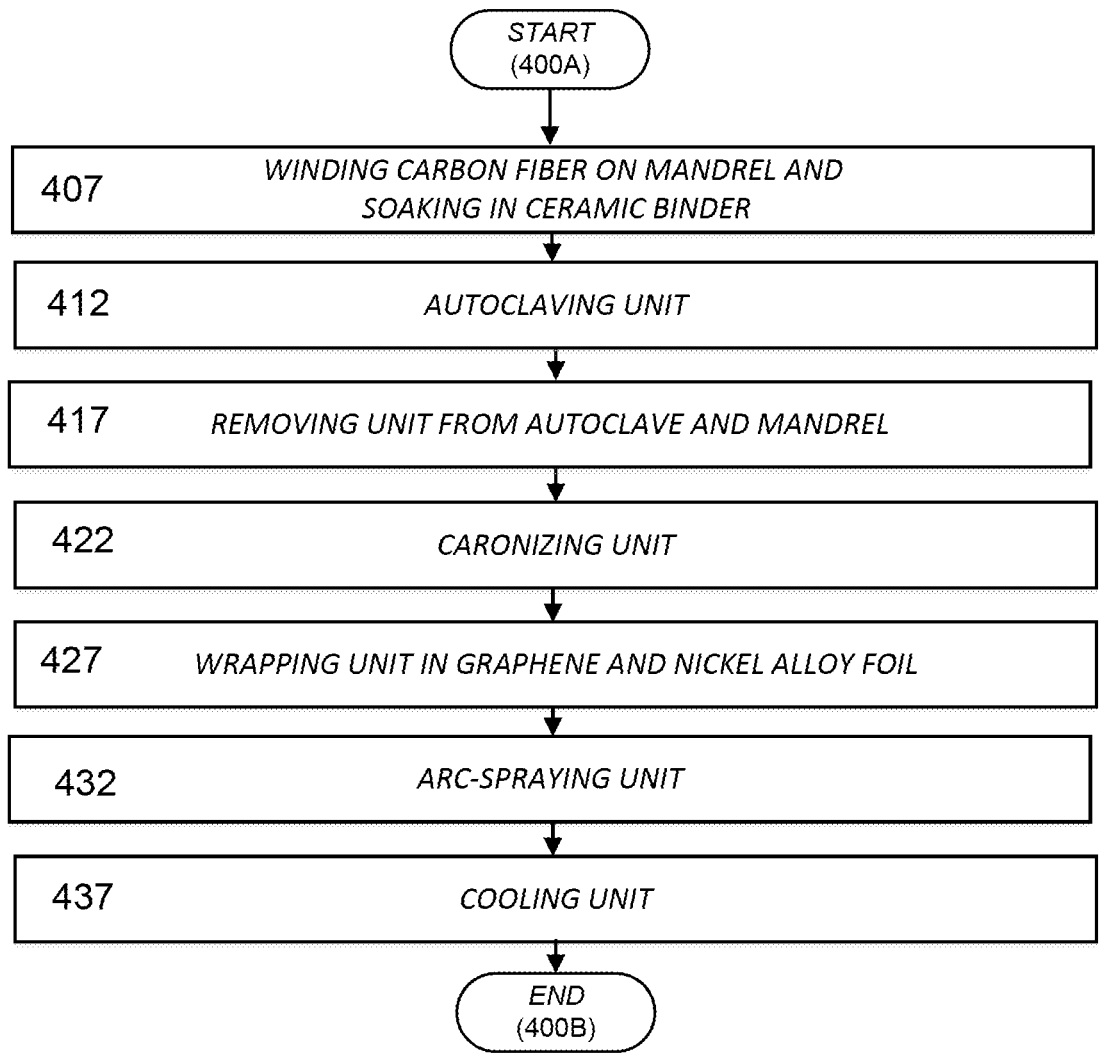
FIG. 10 depicts an embodiment of a process for manufacturing a production train section.

FIG. 10 depicts an embodiment of a manufacturing process 400A for manufacturing the train section 210, the production train base section 211, and/or the train connector 212. The process 400A can be carried out under control of the controller 400 reading and executing sections of code or computer-readable instructions from a non-transitory computer-readable medium, including: winding carbon fiber on a mandrel and then soaking it in a ceramic binder (at Step 407); autoclaving the unit under pressure in a vacuum bag or in a vacuum or nitrogen atmosphere at 190° F. to set the carbon fiber/phenolic resin binder (at Step 412); removing the unit from the autoclave and, then, removing it from the mandrel (at Step 417). The unit can be fired in an electric furnace under a nitrogen atmosphere pressure at 1,500° F., or more, until substantially all off gassing has occurred and the unit is carbonized, resulting in a ceramic well pressure vessel (at Step 422). The carbonized unit can be covered in super insulating graphene and wrapped in a thin, high temperature nickel alloy foil (at Step 427). The wrapped unit can be thermally arc-sprayed with high temperature nickel alloy until the nickel alloy shield is consolidated (at Step 432). The consolidated unit can be cooled and readied for storage or transport (at Step 437). In an alternative embodiment, a high temperature nickel alloy tube can be welded to the end connectors before being wound with carbon fiber on the tube soaking it in a ceramic binder.

In an embodiment, the process 400A can include: wrapping a high temperature nickel alloy tube, instead, with carbon fiber; adding a layer of super-insulating graphene and wrapping a layer of nickel alloy foil around it; and spraying a protective coating of high temperature nickel alloy over the graphene nickel foil in a nitrogen atmosphere or electroplate this assembly with a high temperature nickel alloy resulting in a nickel alloy well pressure vessel.

Figure 11:
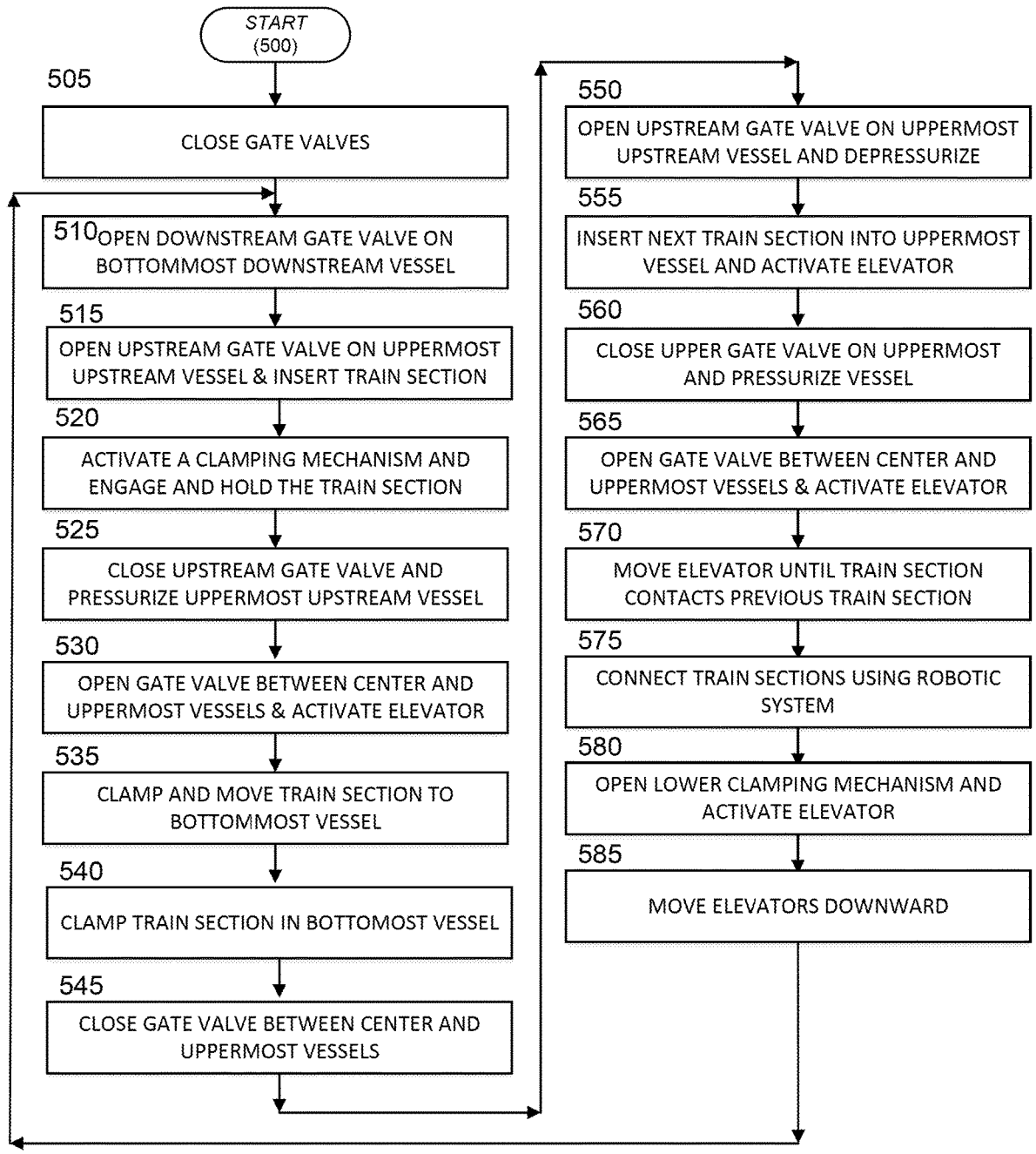
FIG. 11 depicts an embodiment of a process for installing a production train in an ultra-deep well.

FIG. 11 depicts an embodiment of an installation process 500 that can be carried out by the PTI system 10, for example, based command instructions from the controller 400. In an embodiment, any one or more of the train sections 210 that are to be connected to form the production train 200 can include a pre-installed sub-connector 212B at its upstream end and a pre-installed sub-connector 212A at its downstream end.

In an alternative embodiment, the multivessel system 194 (shown in FIGS. 1-3) can be configured to repeatedly receive train sections 10 and train connectors 212 alternately and attach each train section 210 to the production train 200 using a respective train connector 212.

Referring to FIGS. 1-3 and 11, initially, the multivessel system 194 can be pressurized after closing (or keeping closed) the gate valves 192 (Step 505) and opening the gate valve 192 at the bottom of vessel 173 (Step 510), while keeping borehole 20 fully pressurized at all times with nitrogen or other gas. At Step 510, a bottom hydraulic drill train vice clamp, which can be provided in or affixed to the vessel-foundation connector, can be set to an open position. At Step 510, the gas inlet valve 125 can be opened to inject pressurized gas into the downstream pressure vessel 173. In an embodiment, the vice clamp can be attached to the tower 170 and does not move vertically.

Once the bottommost downstream vessel 173 has been sealed from the center vessel 172, the upper gate valve 192 on the uppermost upstream vessel 191 can be opened and a train section 210 inserted into the upstream pressure vessel 171 (Step 515). At the beginning, a production train base section 211 can be provided to start the production train 200, after which individual train sections 210 can be inserted and connected to form the production train 200. For each subsequent performance of Step 515, a train section 210 will be provided. One of the plurality of clamping mechanisms can be activated to hold the train section 210 in the uppermost upstream pressure vessel 171 (Step 520). The train section 210 can be inserted into upstream pressure vessel 171 using the crane 190.

In an embodiment, each train section 210 can include preinstalled upstream and downstream sub-connectors 212A, 212B.

In another embodiment, a set of sub-connectors 212A, 212B can be inserted before each train section 210 into the multivessel system 194. The downstream sub-connector 212B can be connected by the robotic system (not shown) to the top of the production train 200 and the upstream sub-connector 212A can be connected to the bottom end of the train section 210. The robotic system (not shown) can then connect the sub-connectors 212A, 212B to each other and weld a circumferential weld to form a pressure seal.

After the train section 210 is inserted downstream, past the uppermost gate valve, the upstream gate valve on the uppermost upstream vessel 171 can be closed and the gas inlet valve 125 opened to pressurize the pressure vessel (Step 525). The upstream vessel 171 can be pressurized to a pressure equal to the pressure in the center vessel 172 and/or bottommost downstream vessel 173. The gate valve 192 located between the center pressure vessel 172 and the upstream pressure vessel 171 can be opened and movement of one of the hydraulic ball screw elevators 1905 can be activated (Step 530). The clamp on the elevator can be operated to clamp and lower the train section 210 into the bottommost downstream pressure vessel 173 (Step 535).

In the bottommost downstream vessel 173, the train section 210 can be clamped with the hydraulic ball screw pressure sealing clamp in the pressure vessel (Step 540) and the gate valve between the center and uppermost upstream pressure vessels can be closed (Step 545). The upper gate valve 192 on the uppermost vessel 171 can be opened and the vessel depressurized to receive the next or second train section 210 (Step 550).

As, or after, the next train section 210 is inserted into the upstream vessel 171, movement of one of the hydraulic ball screw elevators 1905 in the upstream pressure vessel 171 can be activated and the second train section 210 clamped (Step 555). The gate valve 192 at the upstream end of the uppermost vessel 171 can be closed and the vessel pressurized, including, for example, opening the gas inlet valve 125 to inject pressurized gas (Step 560). The gate valve between the middle pressure vessel 172 and the upper pressure vessel 171 can be opened and downward movement of one of the hydraulic ball screw elevators 1905 activated in the uppermost pressure vessel 171 (Step 565) and moved until the clamped train section 210 makes contact with the clamped train section 210 (or dill train 200) held by the hydraulic ball screw elevator 1905 in the downstream pressure vessel 172 (Step 570), with the train sections 210 (or train section 210 and production train 200) being held in alignment with each other.

With the train sections in alignment, the robotic system (not shown) can be activated to connect the train sections 210, for example, with the train connector 212, or with pipe threads at the connecting ends, thereby joining the units (Step 575). In an embodiment, the robotic system can include, for example, bolt insertion and torque wrench arm or a rotary drill tube screw unit. The robotic system can include one or more robotic arms in the upstream pressure vessel 171.

The lower clamping mechanisms can be opened and downward movement of the upper hydraulic ball screw elevators activated to move the production train 200 downward into the borehole 20 and allow for the next train section 210 to be inserted into the multivessel system 194 (Step 580). Steps 510 through 580 can be repeated until the production train 200 is completed and installed in the borehole 20. The shutoff valve 145 can be closed and the underground super critical fluid transport pipe can be installed and connected between the borehole 20 and geothermal energy harnessing (GEH) system 600 (shown in FIG. 12).

In an embodiment, the PTI system 10 can be configured to perform a process that includes: starting with all pressure vessels in the multivessel system 194 fully pressurized; depressurizing the upper pressure vessel 171 and opening the upper gate valve 192 in the upper pressure vessel 171 and inserting a train section 210 into the upper pressure vessel 171; activating one of the plurality of clamping mechanisms to hold the first train section 210 in the upper pressure vessel 171; closing the upper gate valve 191 on the upper pressure vessel 171 and pressurizing the upper pressure vessel 171 to a pressure equal to the pressure in the middle and bottom pressure vessels 172, 173; opening the gate valve 192 located between the middle pressure vessel 172 and the upper pressure vessel 171; activating movement of one of the hydraulic ball screw elevators 1905 to clamp and lower the first train section 210 into the middle and bottom pressure vessels 172, 173; clamping the first train section 210 with one of the hydraulic ball screw clamps in the bottom pressure vessel 173; closing the gate valve 192 between the middle pressure vessel 172 and the upper pressure vessel 171; depressurizing the upper pressure vessel 171 and opening the upper gate valve 192 on the upper pressure vessel 171 and inserting a second train section 210 into the upper pressure vessel 171; activating movement of one of the hydraulic ball screw elevators 1905 in the upper pressure vessel 171 and clamping the second train section 210; closing the upper gate valve 192 on the upper pressure vessel 171 and pressurizing the upper vessel 171; activating downward movement of one of the hydraulic ball screw elevators 1905 in the upper pressure vessel 171 until the clamped second train section 210 slides over and onto the clamped first train section 210 held by the hydraulic ball screw clamp in the middle pressure vessel 172; activating a welding robot located between the middle pressure vessel 172 and the upper pressure vessel 171 to plug weld and circumferentially weld the end connectors of the two train sections 210 together completing a pressure seal. In an alternative embodiment, male and female threads can be formed on the training sections 210 during manufacturing and the train sections can be, instead, robotically screwed together.

In an embodiment, the supercritical fluid, which is produced in the lower regions of the borehole 20, can have a temperature from about 720° F. to about 1300° F. The production train 200, including each train section 210 and/or train connector 212, can be configured to be super-insulated, for example, by including a super insulating graphene material. The supercritical fluid can include, for example, a liquid or gas at supercritical temperatures and pressures. The liquid can include, for example, water, and the gas can include, for example, carbon-dioxide ($CO_2$).

FIG. 12 depicts an embodiment of a geothermal energy harnessing (GEH) station 600. The GEH station 600 can be implemented alone or in combination with additional similar GEH stations to form a geothermal energy harnessing (GEH) system.

The GEH station 600 can include a well-pressure retention valve 143, the high-pressure fluid pump 144, the IO flow separator 146, the inlet pressure control valve system 148, a vacuum pump 149, a supercritical fluid-to-steam (SFTS) converter 150, a steam turbine 160, and a condenser 165. The vacuum pump 149 can be connected to a vacuum super-insulated region 1491 to provide superinsulation with vacuum. The GEG station 600 can be configured to form a closed, pressurized system with the borehole 20 that maintains a predetermined pressure or pressure range at all times. The GEH station 600 can be configured to controllably inject high-pressure fluid (for example, water or carbon dioxide) through the inlet pressure control valve system 148 and IO flow separator 146 into the borehole 20. The GEH station 600 can be configured to controllably outlet supercritical fluid from the production train 200 through the IO flow separator 146 to the SFTS converter 150, where the supercritical fluid can be converted to steam to drive the steam turbine 160, before being condensed by the condenser 165 and returned via the pump 144, inlet pressure control valve system 148 and IO flow separator 146 to the borehole 20 to be reheated by geothermal energy in the borehole 20.

The GEH station 600 can include thermal insulation throughout the process so as to minimize heat transfer from the circulating fluid in the system to the ambient environment. In an embodiment, the GEH station 600 can include a plurality of underground high-temperature insulator concrete vaults to minimize cooling of the supercritical fluid as it flows from the IO flow separator 146 to the SFTS converter 150.

The GEH station 600 can be configured to pump pressurized fluid F (for example, water or carbon-dioxide) into and down the borehole 20, for example, between an outer wall of the production train 200 and in the borehole wall 24, to the bottom of the borehole 20, where the fluid F is heated to a supercritical temperature of, for example, about 1,000° F. to 1,300° F., or more. This is significantly more than the 360° F. maximum temperatures achievable by state-of-the-art geothermal energy production systems. The heated pressurized fluid F enters the supercritical fluid openings 205 in the production train base 201 and upflows in the production train 200 as supercritical fluid SCF. The supercritical fluid SCF is channeled through the IO flow separator 146 to the SFTS converter 150. The temperature of the supercritical fluid SCF reaching the SFTS converter 150 can be adjusted by controller 400 by, for example, adjusting the speed of the high-pressure fluid pump 144.

In an embodiment, the high-pressure fluid pump 144, the inlet pressure control valve system 148, and the well pressure retention valve 143 can be computer-synchronized by the controller 400 to control the pressure, volume, rate, or velocity of the pressurized fluid as it exits the high-pressure fluid pump 144, and before it enters the wellbore 20, while simultaneously controlling the pressure, volume, rate, or velocity of the supercritical fluid SCF at the well pressure retention valve 143, resulting in a constant controllable wellbore pressure that counteracts the earths lithostatic pressure thereby preventing wellbore collapse and providing fully controllable mass flow for increased or decreased power.

In an embodiment, after a directed energy drilling gun and related drill pipe equipment are removed from the wellbore 20, the PTI system 10 can be operated to install the permanent full depth super insulated production train 200 in the well bore, maintaining constant high nitrogen pressure in the well. When the production train 200 is installed to full depth and connected to the inlet flow pressure control valve system 143 and the well pressure retention valve 153 and piping at the surface, the high-pressure water pump 144 can be installed and activated, and the nitrogen can be displaced by slightly higher-pressure water, maintaining the necessary pressure in the well at all times. The production train 200 can be made of, or include, carbon fiber-ceramic or carbon fiber-high temperature nickel alloy pipes with Hastelloy X or carbon fiber-ceramic end connection terminators that are wound on a mandrel, then autoclaved, and then fired in a furnace several times, adding more ceramic binder in each firing, making them stronger and denser each time. The end product is a strong and lightweight pipe that will not stretch and break in a 60,000 foot or more length when suspended from the top of the well 20.

Figure 13:
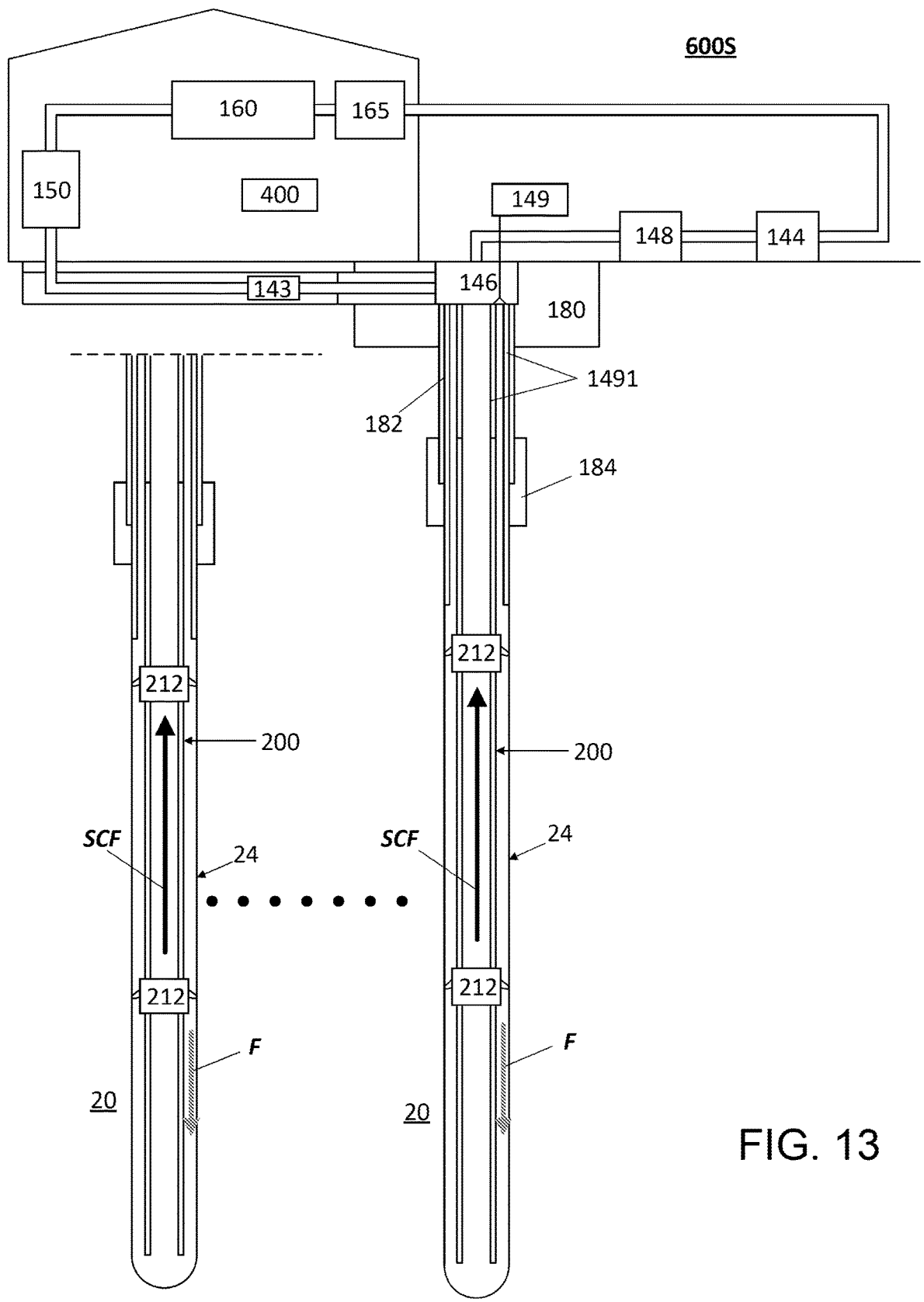
FIG. 13 depicts an embodiment of a geothermal energy harnessing station, including a GEH station.

FIG. 13 depicts an embodiment of a geothermal energy harnessing (GEH) system 600S, which can include a plurality of GEH stations 600 and/or a plurality of boreholes 20, each equipped with a production train 200. The GEH system 600S can be configured to control operation of each individual borehole 20, including, for example, placing any individual well or group of wells such that it can be shut down in a sequence to allow for heat build-up in any individual well or group of wells.

This is not the case for any state-of-the art metal pipe. Metal pipes will stretch and break at between about 35,000 to 42,000 feet. The carbon fiber/ceramic pressure production train 200 can include Hastelloy X sleeve train connectors 212, which can be radially and pocket welded together. Each train connector 212 can have a spring-loaded, roller tipped 3 claw or more arrangement attached to the body of the train connector 212. The claws can be configured to center the production train 200 in the borehole 20 and provide support for the weight of the 60,000 foot or more structure.

In operation, the high-pressure fluid pumps 144 can control the power output of the entire system by changing their speed from zero to full speed in revolutions-per-minute (rpm), giving this system the ability to completely stop power production or operate at any desired fraction of total power output, depending on the requirements of the grid or industry being served. This also means that any group of wells equipped with production trains 200 can be cycled to allow heat recovery, if necessary, in any given well while the rest of the wells are operational. These pumps 144 can pump water from the GEH station 600 through the inlet pressure control valve system 148, maintaining a continuous specific pressure in the well. The GEH station 600 can be included a power generating or desalination plant.

The inlet pressure control valve system 148 can be configured to vary the fluid flow to provide adjustable heat transfer into the fluid F or supercritical fluid SCF providing variable, fully adjustable power outputs. In an embodiment, a valve can be provided on the input side of the well and a valve on the output side of the well providing complete control of well pressure and flow.

The borehole wall 24 can be insulated down to 11,000 feet or more. At that point, heat transfer from the borehole wall 24 into the down flowing fluid F can begin. At approximately 11,000 ft. deep depending upon geology, the temperature of the fluid coming from the condenser 165 and the borehole wall 24 will be the same (for example, about 200° F.). From that point on the borehole wall 24 will continue to rise in temperature. At about 41,000 ft. deep on average the temperature will exceed 705° F. and the pressure will exceed 3,210 psi, which is the point at which fluid F such as water becomes supercritical fluid SCF. From this point, down to 60,000 ft or more, the fluid will gain heat of more than 1,000° F. and the pressure could be as high as 50,000 to 60,000 psi or more at the well bottom.

The supercritical fluid SCF will enter the open bottom of the production train 200 (including, for example, a super-insulated well pressure vessel pipe) and ascend at a high rate of speed, remaining supercritical to the surface and on to the GEH station 600. The supercritical fluid SCF can first pass through the well pressure retention and flow control valve 143. This valve can be configured to ensure that the well retains a predetermined pressure and allows the proper mass flow to the turbine 160 or a desalination super heater (not shown). The supercritical fluid SCF can pass through the buried refractory concrete insulated vaults 189, thereby maintaining its temperature and pressure until it reaches, for example, the SFTS converter 150. The SFTS converter 150 can include a carbon fiber/ceramic material, and the supercritical fluid SCF can enter the carbon SFTS converter 150, turning it into high pressure steam. This steam can then go through the normal cycle of a steam generating plant into the multi chamber turbine 160 or to the desalination super heater (not shown) and on to the condenser 165, thereby completing the closed loop cycle back to the high-pressure pumps 144 and down the wells.

In an embodiment, after installing the production train 200, including, for example, super insulated pressure vessels, under sufficient nitrogen pressure to prevent borehole collapse, the pressure can be maintainable while the high-pressure fluid pumps 144 are engaged and the well is filled with a fluid such as, for example, water, at a slightly higher pressure until the nitrogen is displaced, maintaining a constant pressure in the well bore 20. The pressure valves 143, 148 are closeable and the PTI system 10 (shown in FIGS. 1-3) can be removed and the borehole 20 made ready to produce supercritical fluid, thereby producing geothermal energy for electrical power generation or heating for desalinization or other thermodynamic processes.

In an embodiment, the production train 200 can include a plurality of super insulated pressure vessels insertable into the borehole 20 for receiving a supercritical fluid from the borehole 20, whereby the supercritical fluid is produced in the lower regions of the borehole. The super insulated pressure vessels can be configured to substantially maintain the supercritical fluid's temperature and pressure while ascending to the surface and on to, for example, an electrical generating plant or desalination plant or other industries requiring heat processes.

In an embodiment, the plurality of super insulated well pressure vessels can be plug welded and circumferentially welded robotically in the multivessel system 194 (shown in FIG. 103) to create a pressure seal as the production train 200 is lowered into the borehole.

In an embodiment, PTI system 10 can be configured to supply one or more borehole sealing material supply tubes, such as, for example in the drilling train configured with spray nozzles located above a flared end that can deliver a high temperature sealant to the borehole 20 when the drill train is being raised out of the borehole during extraction.

In various embodiments, the supercritical fluid can include supercritical water or supercritical carbon dioxide.

In various embodiments, the depth of the borehole 20 can be between about 20,000 and 60,000 feet, and preferably between about 41,000 to about 60,000 feet or more.

In an embodiment, a thin layer of fine particles can be included to insulate the production train 200, and to insulate the first 11,000 feet or more of the borehole wall lining 24, wherein the thin layer of fine particles can be held with a sleeve insertable in the borehole 20 contained in one or more pressure-sealed carbon fiber/ceramic sleeves with a vacuum applied after installation. As an alternative, a layer of super-insulating graphene can be contained in a carbon fiber/ceramic sleeve or a high temperature nickel alloy sleeve and inserted in the first 11,000 feet or more of the borehole 20 and attached to the ceramic borehole wall lining 24. The thin layer of fine particles can include, for example, ground fly ash or perlite.

In an embodiment, a different, second, type of IO flow separator can be included in place of the IO flow separator 146 and configured to separate pressurized fluid to be introduced into the borehole 20 from the exiting supercritical fluid in the well pressure vessels of the production train 200. The IO flow separator 146 can be configured to direct the supercritical fluid to the well pressure retention and flow control valve 143 and then into a super insulated carbon fiber pipe (shown in FIG. 9) and then into underground super insulated refractory concrete vaults 189 and filled with micro perlite. A vacuum can be applied by the vacuum pump 149 to the entire system of vaults extending to the GEH station 600.

In an embodiment the refractory concrete vaults 189 can be vacuum sealed, one vault sealed to the other vault and between the vaults, and with a sealed vault top cover by a flexible mastic or O-rings inserted into matching grooves in the adjacent parts, the refractory concrete vaults 189 can be configured to withstand temperatures of 1,300° F., or more.

In an embodiment, the production train 200 can include super insulated well pressure vessel walls that are constructed with different wall thicknesses between different super insulated well pressure vessels. The different wall thickness can be selected based on expected differences in interior and exterior pressures of vessels installed at different elevations in the borehole 20.

In an embodiment, the production train 200 can include, for example, 26½ or 53-foot-long super insulated well pressure vessels manufactured from carbon fiber with a ceramic or phenolic resin binder and wound on a steel mandrel and autoclaved at 190° F. in a vacuum bag or in a vacuum or nitrogen atmosphere and then removed from the mandrel and then baked in an electric oven under a nitrogen atmosphere at 1500° F., or more, until substantially all of the gases are removed and the resin is carbonized resulting in a carbon fiber/ceramic tube and then wrapped in super insulating graphene and then wrapped in high temperature nickel alloy foil and then sprayed under a nitrogen atmosphere or electroplated with a high temperature nickel alloy protective coating or, as an alternative, a high temperature nickel alloy tube may be wound with carbon fiber and then with super insulating graphene then wrapped in high temperature nickel alloy foil and sprayed under a nitrogen atmosphere or electroplated with a high temperature nickel alloy protective coating creating a new well pressure vessel.

In an embodiment, the production train 200 can include pressure vessels manufactured according to a process comprising: winding carbon fiber on a mandrel and then soaking it in a ceramic binder; autoclaving the units under pressure in a vacuum bag or in a vacuum or nitrogen atmospheric autoclave at 190° F. to set the ceramic or phenolic resin binder; removing the units from the autoclave and the mandrel; firing the units in an electric furnace under a nitrogen atmosphere at 1500° F., or more, until substantially all off gassing has occurred and the units are carbonized, resulting in a ceramic well pressure vessel; and cooling the units and loading them into their storage and transport containers. In an embodiment, the pressure vessels can include a high-temperature nickel alloy tube wrapped in carbon fiber and then with a layer of super insulating graphene and then wrapped with a thin nickel alloy foil and sprayed with a protective coating of high temperature nickel alloy over the nickel alloy foil in a nitrogen atmosphere or electroplate this assembly with a high temperature nickel alloy resulting in a nickel alloy well pressure vessel.

It is understood that the various disclosed embodiments are shown and described above to illustrate different possible features of the disclosure and the varying ways in which these features can be combined. Apart from combining the features of the above embodiments in varying ways, other modifications are also considered to be within the scope of the disclosure. The disclosure is not intended to be limited to the preferred embodiments described above. The disclosure encompasses all alternate embodiments that fall literally or equivalently within the scope of these claims.

The various embodiments discussed above can be mixed and matched as needed.

The terms "a," "an," and "the," as used in this disclosure, means "one or more," unless expressly specified otherwise.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The term "controller" can be used interchangeably with the terms "computer," "computing device," or "processor," which, as used in this disclosure, mean any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and their variations, as used in this disclosure, mean "including, but not limited to," unless expressly specified otherwise.

References in the disclosure to "one embodiment," "an embodiment," "an example embodiment," or "example," indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" can be interpreted to include not only the explicitly recited concentration of about 0.1 wt. % to about 5 wt. %, but also the individual concentrations (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "or" is used to refer to a nonexclusive "or" unless otherwise indicated. Unless indicated otherwise, the statement "at least one of when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" can be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

LIST OF LEGENDS IN THE DRAWINGS

10: ultra-deep well (UDW) production train installation (PTI) system
20: ultra-deep borehole
24: borehole wall
26: indentation
110: power generator
112: power line
120: gas generator
122: gas supply line
124: compressor
125: gas inlet valve
140: flow control and well pressure control (FCPC) valve system (or outlet pressure control valve system)
141: outlet line
143: well pressure retention valve
144: high-pressure fluid pump
145: shutoff valve
146: inlet-outlet (IO) flow separator
148: inlet pressure control valve system
149: vacuum pump
150: supercritical fluid-to-steam (SFTS) converter
160: steam turbine
165: condenser
170: tower
171: upstream pressure vessel
172: center pressure vessel
173: downstream pressure vessel
180: well foundation
182: well-cap casting
184: metal well seal
189: underground high-temperature insulator concrete vaults
190: crane
192: high-pressure gate valve
193: clamping mechanism
194: multivessel pressure vessel system
198: clamp motor
200: production train
201: production train base
202: grooved Hastelloy X or nickel alloy tube
203: base plug weld slot
205: supercritical fluid openings
210: train section
211: production train base section
212: train connector
212A: upstream sub-connector
212B: upstream sub-connector
220: high-speed super critical fluid upflow pipe
230: carbon fiber/ceramic super critical fluid pipe wall
240: super-insulating graphene layer
250: high temperature nickel alloy fil/arc spray coated
255: cone nickel alloy train connector
260: plug weld slot
270: engagement member
280: circumferential weld
290: underground super critical fluid transport pipe
291: carbon fiber/ceramic super critical fluid pipe wall
292: super insulating graphene layer
293: high-temperature nickel alloy foil/arc spray coated with high-temperature nickel alloy protective coating
294: carbon fiber/ceramic pipe wall
295: high-temperature O-ring seal
296: bolt and O-ring pipe flange
297: bolt holes
400: controller
600: geothermal energy harnessing (GEH) station
1461: fixed bottom gate valve
1462: fixed hydraulic drill train conical clamping mechanism
1463: gas flow separator
1491: vacuum super-insulated region
1905: internal hydraulic ball screw clamping sled (or elevator)

1908: hydraulic or electric worm gear motor
1910: vessel housing
1912: production train channel
1932: screw ball bearing rings (descending or ascending)
1934: spiral ball race
1935: rotating spiral-grooved tube
1936: flat ball bearing rings
1938: spiral ball bearing grooved Hastelloy X pressure vessel tube
1940: pressure vessel clamp
1941: connecting pipe
1942: ball bearings
1943: smooth bore Hastelloy X pressure vessel tube
1944: gas separator piston
1945: pressure sealing piston rings
1946: screw plug (to install roller bearings)
1947: anti-rotational slide bars
1948: Rotec thrust bearing
1949: O-ring seals
1964: graphene super insulation with vacuum layer
1965: Hastelloy X or nickel-alloy wave guide tube
1966: carbon fiber bonding area
1967: carbon fiber ceramic shell
1968: connector housing
1969: super insulation with vacuum
2121: extendable well pressure vessel claw arm system
2122: detent
2123: toothed borehole gripper
2124: pressure activated cylinder

The invention claimed is:

1. A multivessel system comprising a plurality of pressure vessels for installing a production train into an ultra-deep borehole into the Earth's lithosphere, the system comprising:
   a plurality of gate valves, each gate valve being configured to provide a hermetic seal between at least two spaces;
   a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a train channel, the first pressure vessel further comprising a first vessel downstream opening;
   a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the train channel, the second pressure vessel further comprising a second vessel downstream opening;
   a third pressure vessel comprising a third vessel upstream opening configured to receive the train section from the second vessel downstream opening through a third one of said plurality of gate valves, the third pressure vessel being configured with a smooth cylinder bore and a burn gas ejection piston with a center hole through which the production train passes and containing a pressure sealing clamp configured to hold and connect the train section to the production train, the third pressure vessel comprising a third vessel downstream opening;
   an input-output separator configured to segregate a super-critical fluid up-flowing from the borehole from a pressurized fluid being supplied into the borehole; and
   a train clamp configured to engage and hold the production train in the borehole,
   wherein each of said first vessel elevator and said second vessel elevator includes a clamp configured to engage and hold the train section as the respective first vessel elevator or the second vessel elevator moves along the train channel.

2. A multivessel system comprising a plurality of pressure vessels for installing a production train in an ultra-deep borehole into the Earth's lithosphere, the system comprising:
   a plurality of gate valves, each gate valve being configured to provide a hermetic seal between at least two spaces;
   a first pressure vessel comprising a first vessel upstream opening configured to receive a train section through a first one of said plurality of gate valves and a first vessel elevator configured to engage and hold the train section as the first vessel elevator moves in the first pressure vessel along a portion of a length of a train channel, the first pressure vessel further comprising a first vessel downstream opening;
   a second pressure vessel comprising a second vessel upstream opening configured to receive the train section from the first vessel downstream opening through a second one of said plurality of gate valves and a second vessel elevator configured to engage and hold the train section as the second vessel elevator moves in the second pressure vessel along another portion of the length of the train channel, the second pressure vessel further comprising a second vessel downstream opening; and
   a train clamp configured to engage and hold the production train in the borehole,
   wherein each of said first vessel elevator and said second vessel elevator includes a clamp configured to engage and hold the train section as the respective first vessel elevator or the second vessel elevator moves along the train channel.

3. The multivessel system in claim 2, further comprising:
   a third pressure vessel comprising a third vessel upstream opening configured to receive the train section from the second vessel downstream opening,
   wherein at least one of the first pressure vessel, the second pressure vessel and the third pressure vessel comprises a robotic arm that is configured to connect the train section to the production train.

4. The multivessel system in claim 2, wherein the first vessel elevator or the second vessel elevator comprises an internal spiral hydraulic ball screw elevator.

5. The multivessel system in claim 2, wherein the production train includes one or more super-insulated well pressure vessel walls constructed with different wall thicknesses between different super-insulated well pressure vessels, the different wall thickness being selected based on expected differences in interior and exterior pressures of the super-insulated well pressure vessels installed at different elevations in the borehole.

6. The multivessel system in claim 2, further comprising one or more high-pressure fluid pumps, each being configured to operate at an adjustable speed, ranging from a complete shutdown of the borehole to a maximum speed that results in maximum mass flow of super-critical fluid, including any intermediate, fully adjustable power setting.

7. The multivessel system in claim 6, further comprising a controller, wherein operation of the one or more high-pressure fluid pumps is controlled by the controller such that the borehole can be shut down in a sequence to allow for heat build-up while another fluid pump at another borehole is operated for geothermal energy harnessing at said another borehole.

8. The multivessel system in claim 3, wherein the third pressure vessel comprises a smooth internal cylinder bore and a piston having an internal pressure sealing hydraulic pipe clamp and attached to the second vessel elevator by a fixed steel tube to allow the production train to pass through the piston and be pressure sealed and at the same time allow an exhaust waste gas to be ejected and separated.

9. The multivessel system in claim 2, further comprising an input-output separator configured to segregate an outlet fluid up-flowing through the production train from an inlet fluid being supplied to the borehole.

10. The multivessel system in claim 4, further comprising a fixed hydraulic conical clamp located between the third pressure vessel and input-output separator.

11. The multivessel system in claim 2, wherein the production train comprises a carbon fiber-ceramic layer.

12. The multivessel system in claim 2, wherein the production train includes a plurality of graphene super insulated pressure vessels insertable into the borehole for receiving a supercritical fluid from the borehole, whereby the supercritical fluid is produced in the lower regions of the borehole.

13. The multivessel system in claim 12, wherein each of the plurality of graphene super insulated pressure vessels is configured to maintain a temperature of the supercritical fluid temperature substantially equal to a temperature at a bottom of the borehole.

14. The multivessel system in claim 2, further comprising a robot that is configured to plug weld and circumferentially weld the train section to the production train to create a pressure seal and add adequate tensile strength as the production train is lowered into the borehole.

15. The multivessel system in claim 2, wherein the borehole is lined with a high temperature sealant during extraction of a drill train from the borehole prior to installation of the production train.

16. The multivessel system in claim 12, wherein the supercritical fluid include supercritical water or supercritical carbon dioxide.

17. The multivessel system in claim 2, further comprising a sleeve in the borehole containing super insulating graphene protected by a carbon fiber/ceramic sleeve.

18. The multivessel system in claim 2, further comprising one or more underground super insulated refractory concrete vaults filled with micro perlite and a vacuum applied after installation.

19. The multivessel system in claim 18, further comprising a well pressure retention and flow control valve and a second type of input-output flow separator, wherein the second type of input-output flow separator is configured to separate a pressurized fluid being introduced into the borehole from an exiting supercritical fluid and direct the supercritical fluid to the well pressure retention and flow control valve.

* * * * *